United States Patent
Chou et al.

(10) Patent No.: US 11,034,797 B2
(45) Date of Patent: Jun. 15, 2021

(54) POLYIMIDE PRECURSOR COMPOSITION, USE THEREOF AND POLYIMIDE MADE THEREFROM

(71) Applicant: ETERNAL MATERIALS CO., LTD., Kaohsiung (TW)

(72) Inventors: Meng-Yen Chou, Kaohsiung (TW); Chung-Jen Wu, Kaohsiung (TW); Chang-Hong Ho, Kaohsiung (TW); Shun-Jen Chiang, Kaohsiung (TW); Po-Yu Huang, Kaohsiung (TW); Chung-Kai Cheng, Kaohsiung (TW)

(73) Assignee: ETERNAL MATERIALS CO., LTD., Kaohsiung (TW)

( * ) Notice: Subject to any disclaimer, the term of this patent is extended or adjusted under 35 U.S.C. 154(b) by 0 days.

(21) Appl. No.: 15/941,052

(22) Filed: Mar. 30, 2018

(65) Prior Publication Data

US 2018/0282482 A1 Oct. 4, 2018

(30) Foreign Application Priority Data

Mar. 31, 2017 (TW) .................. 106111470

(51) Int. Cl.
  *C08G 73/10* (2006.01)
  *C08G 73/06* (2006.01)
  *C08G 73/18* (2006.01)
  *C08G 73/02* (2006.01)

(52) U.S. Cl.
  CPC ..... *C08G 73/1071* (2013.01); *C08G 73/0273* (2013.01); *C08G 73/0605* (2013.01); *C08G 73/0627* (2013.01); *C08G 73/0633* (2013.01); *C08G 73/0644* (2013.01); *C08G 73/1085* (2013.01); *C08G 73/18* (2013.01)

(58) Field of Classification Search
  CPC . C08G 73/1042; C08G 73/1007; C08L 79/08; Y10S 430/121
  See application file for complete search history.

(56) References Cited

U.S. PATENT DOCUMENTS

| | | | | |
|---|---|---|---|---|
| 4,332,656 A | * | 6/1982 | Gagliani | ............... C08J 3/28 521/180 |
| 6,172,127 B1 | * | 1/2001 | Choi | .................. C08G 73/1021 521/77 |
| 2006/0142538 A1 | * | 6/2006 | Tsutsui | .................. C08G 73/10 528/310 |
| 2009/0139753 A1 | | 6/2009 | Kim et al. | |
| 2010/0266829 A1 | * | 10/2010 | Iwai | .......................... C08J 5/18 428/220 |
| 2013/0172494 A1 | | 7/2013 | Cheng et al. | |
| 2013/0172569 A1 | | 7/2013 | Cheng et al. | |
| 2016/0369056 A1 | | 12/2016 | Wu et al. | |

FOREIGN PATENT DOCUMENTS

| | | |
|---|---|---|
| CN | 101117384 A | 2/2008 |
| CN | 101356864 A | 1/2009 |
| CN | 102604156 A | 7/2012 |
| JP | 5 97809 | 4/1993 |
| JP | 2003301044 A | 10/2003 |
| JP | WO2011115077 * | 9/2011 |
| JP | 2013-032507 A | 2/2013 |
| KR | 20110035620 A | 4/2011 |

OTHER PUBLICATIONS

Seo et al "Synthesis of polyimides containing triazole to improve their adhesion to copper substrate", J. Adhesion Sci. Technol., vol. 16, No. 13, pp. 1839-1851 (2002), published on Nov. 2002.*
Non-English Taiwan Office Action dated Aug. 10, 2017 for Application No. TW 1061114790 with an English translation of the Search Report.
Machine English translation of JP2003301044A.
Machine English translation of KR20110035620A.
Office Action and Search Report in CN 201810297659 and English translations thereof.
CN 101356864 A _ Abstract English Translation.
CN101117384 A _ English Translation.
JP 2013-032507 A _ English Translation.
JPH0 5 97809 _ English Translation.
CN 102604156 A _ English Translation.
Suk Hang Chan et al., "Synthesis and Properties of Polyimide with Diazacrown Ether Moiety and the Corresponding Polymer Barium Complexes," Chem. Mater. 2001; 13: 4635-4641 (C6).
Office Action of the Chinese application No. 2018102976596, dated Feb. 1, 2021.
Reference 9—"Electroplating Patent Digest 6"—Institute of Science & Technical Information of Shanghai.
Reference 10—"Functional and Intelligent Polymer Materials"—Qing-Shan Li.

* cited by examiner

*Primary Examiner* — Gregory Listvoyb
(74) *Attorney, Agent, or Firm* — Ladas & Parry LLP

(57) ABSTRACT

The present disclosure relates to a polyimide precursor composition comprising an amic acid ester oligomer of formula (I):

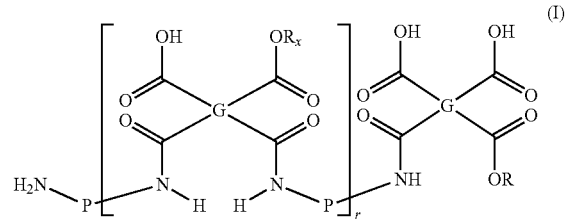

wherein r, $R_x$, G, P and R are as defined in the specification. Also, a use of the polyimide precursor composition and a polyimide made from the polyimide precursor composition.

12 Claims, 1 Drawing Sheet

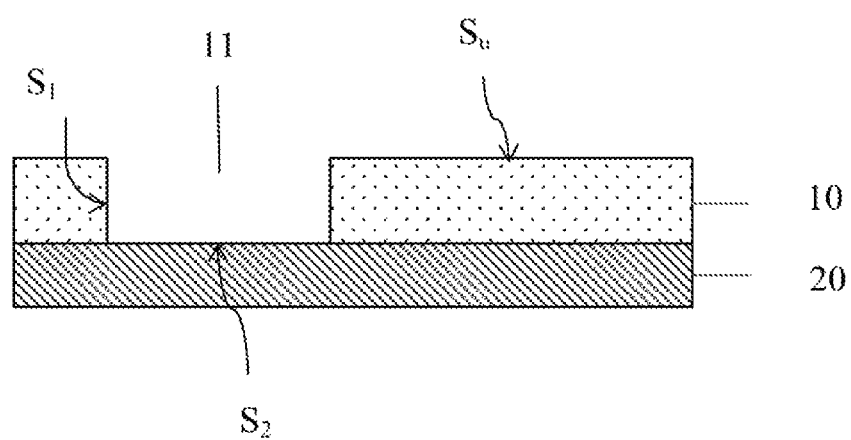

POLYIMIDE PRECURSOR COMPOSITION, USE THEREOF AND POLYIMIDE MADE THEREFROM

BACKGROUND OF THE INVENTION

1. Technical Field

The present disclosure relates to a polyimide precursor composition and the applications thereof. In particular, the present disclosure relates to a polyimide precursor composition that can be used in a laser direct imaging process.

2. Description of the Related Art

A printed circuit board (PCB) is a product where a designed circuit pattern is transferred to a substrate by printing so that the substrate can be equipped with electronic devices and the connection to related circuit signals can be built.

A most common base for fabricating PCB is copper clad laminate (CCL), which is a laminate of copper foil, an optional binder and an insulating substrate. The transfer of the circuit pattern is mainly achieved by using an exposure apparatus through a process comprising: forming a mask with a corresponding circuit pattern, exposing the CCL coated with a photoresist through the mask, and then transferring the circuit pattern to the copper layer by developing, etching and other processes.

The finer the circuit is, the more precise and time-consuming the production of the mask will be, and thus the higher the cost will be. To reduce the time and cost of mask fabrication, PCB manufacturers desire to develop a technology that allows direct imaging without the use of a mask, and even a technology that can metallize an insulating material directly and create circuit patterns thereon, so as to address these issues.

Polyimide is an excellent insulating material. Methods of metallizing polyimide, for example, wet-chemistry and dry methods, have been the focus of development in the art. Wet chemistry method includes alkaline treatment of the surface of polyimide with an alkaline solution such as KOH or NaOH to allow ring opening of the polyimide to generate an acid radical (COO$^-$) that binds with K$^+$, Na$^+$ or other ions, followed by replacement of K$^+$ or Na$^+$ by other suitable metal ions (for example, copper ions) and reduction of the ions in the presence of a reducing agent to produce a metal layer on the polyimide surface. Although this method is fast and inexpensive, the adhesion between polyimide and the metal layer is poor. In the dry method, a film containing AgNO$_3$ is first applied on the polyimide surface and treated by laser or plasma in a specific region to produce silver metal for use as a seed crystal, and then a metal layer is plated on the silver metal. However, this method has the disadvantages including that an additional AgNO$_3$-containing film is needed and the AgNO$_3$-containing film is not easy to remove.

Maskless lithography is a technique of direct imaging (DI), such as laser direct imaging (LDI), without using a conventional mask. It can not only be corrected in real time by using digital images, but also has good yield and accuracy, and is thus widely used in the fabrication of printed circuit boards, IC substrates, flexible circuit boards and other precision products. In the LDI method, for example, conductive particles (such as carbon black) or a conductive precursor (such as graphene oxide) is added to the polyimide, and activated in a specific region by laser irradiation, followed by subsequent metal plating. A precision circuit can thus be fabricated and the fabrication method is relatively simple. However, if the conductive particles or conductive precursor is insufficient, the conductivity of the polyimide layer after laser irradiation is still relatively low, which is not conducive to the subsequent metal plating; and if the conductive particles or conductive precursor is excessive, there is a problem of poor dispersibility. Moreover, the polyimide in the non-activated region may lose the required insulativity, or the polyimide in the non-activated region may have worse impedance when electrified in a reliability test in a high-temperature, high-humidity environment.

In view of the foregoing, the present inventors have found a novel polyimide precursor composition through continuous research. A polyimide prepared therefrom can be activated in a specific region by means of computer-controlled plasma or laser scanning. The polyimide in the activated region can be chelated with metal ions (such as copper ions) after which metal ions can be reduced to metal to increase conductivity. Then another metal layer can be plated on the reduced metal to obtain a desired metal circuit or pattern, thereby improving the disadvantages existing in the surface metallization of polyimide. The present disclosure has the advantages of faster production, better metallization quality and easier operation.

SUMMARY OF THE INVENTION

An aspect of the present disclosure is to provide a new polyimide precursor composition, which comprises an amic acid ester oligomer of Formula (I):

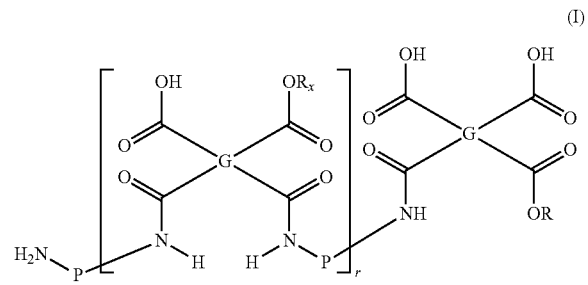

wherein:

r is an integer from 1 to 200;

each R$_x$ is independently H, C$_1$-C$_{14}$alkyl, or a moiety bearing an ethylenically unsaturated group;

each R is independently C$_1$-C$_{14}$alkyl, C$_6$-C$_{14}$aryl or aralkyl, or a moiety bearing an ethylenically unsaturated group;

each G is independently a tetravalent organic group; and each P is independently a divalent organic group, wherein based on the total moles of the divalent organic groups P present in the composition, about 0.5 mol % to about 25 mol % of the divalent organic groups P is an divalent organic group that is capable of forming a coordinate bond with a metal ion.

Another aspect of the present disclosure is to provide a polyimide prepared from the polyimide precursor composition.

Another aspect of the present disclosure is to provide use of the polyimide precursor composition in the preparation of polyimides that can be activated in a plasma or laser direct imaging process.

In order to make the objectives, technical features and advantages of the present disclosure more clear and comprehensible, detailed description is given below by way of some specific embodiments.

BRIEF DESCRIPTION OF THE DRAWINGS

FIG. 1 is a schematic cross-sectional view of sliced electroplated samples obtained in the example and comparative example.

DETAILED DESCRIPTION

For ease of understanding the present disclosure, several terms are defined hereinafter.

The term "about" means an acceptable deviation of a particular value determined by those of ordinary skill in the art, the range of which depends on how the value is measured or determined.

In the present disclosure, the term "alkyl" refers to a saturated, straight or branched hydrocarbon group, which comprises preferably 1-14 carbon atoms, and more preferably 1-6 or 1-4 carbon atoms. Examples of alkyl include, but are not limited to, methyl, ethyl, propyl (such as n-propyl and isopropyl), butyl (such as n-butyl, sec-butyl, isobutyl and tert-butyl), pentyl, hexyl, or similar groups.

In the present disclosure, the term "alkenyl" refers to an unsaturated, straight or branched hydrocarbon group containing at least one carbon-carbon double bond, which comprises preferably 2-10 carbon atoms, and more preferably 3-8 carbon atoms. Examples include, but are not limited to, ethenyl, propenyl, methyl propenyl, isopropenyl, pentenyl, hexenyl, heptenyl, 1-propenyl, 2-butenyl, 2-methyl-2-butenyl and similar groups.

In the present disclosure, the term "aryl" or "aromatic" refers to a monocyclic, bicyclic or tricyclic aromatic ring system having 6 to 14 ring carbon atoms. Examples of aryl include, but are not limited to, phenyl, tolyl, naphthyl, fluorenyl, anthryl, phenanthrenyl and similar groups.

In the present disclosure, the term "halogenated alkyl" refers to an alkyl substituted with a halogen, wherein the "halogen" denotes fluorine, chlorine, bromine or iodine.

In the present disclosure, the term "alkoxy" refers to an alkyl attached to an oxygen atom, which comprises preferably 1-8 carbon atoms, and more preferably 1-4 carbon atoms.

In the present disclosure, the term "heterocyclyl" refers to a saturated, partially saturated (for example, those denominated with the prefix dihydro, trihydro, tetrahydro, hexahydro, or the like), or unsaturated 3 to 14-membered cyclyl containing carbon atoms and at least one heteroatom selected from N, O or S, preferably a 4 to 10-membered cyclyl, and more preferably a 5 or 6-membered cyclyl. The heterocyclyl preferably has 1 to 4 heteroatoms and more preferably 1 to 3 heteroatoms. The heterocyclyl may be a monocyclic, bicyclic or tricyclic ring system, including fused rings (for example, a fused ring formed together with another heterocyclic ring or another aromatic carbocyclic ring).

The polyimide precursor composition of the present disclosure comprises an amic acid ester oligomer of formula (I):

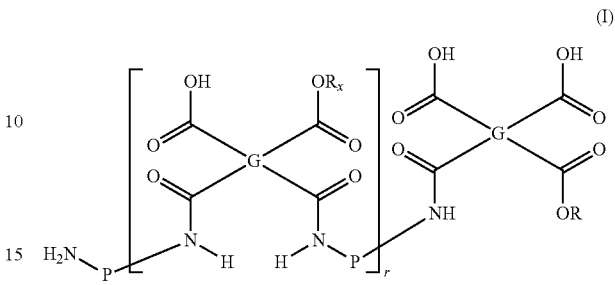

wherein:
r is an integer from 1 to 200, preferably from 5 to 150, and more preferably from 9 to 100;
each $R_x$ is independently H, $C_1$-$C_{14}$alkyl, or a moiety bearing an ethylenically unsaturated group;
each R is independently $C_1$-$C_{14}$alkyl, $C_6$-$C_{14}$aryl or aralkyl, or a moiety bearing an ethylenically unsaturated group;
each G is independently a tetravalent organic group; and
each P is independently a divalent organic group, wherein based on the total moles of the divalent organic groups P present in the composition, about 0.5 mol % to about 25 mol % of the divalent organic groups P is an divalent organic group that is capable of forming a coordinate bond with a metal ion.

In one embodiment of the present disclosure, the divalent organic groups that are capable of forming a coordinate bond with a metal ion can be selected from:
(i) 5 or 6-membered nitrogen-containing heterocyclyl;

(ii)

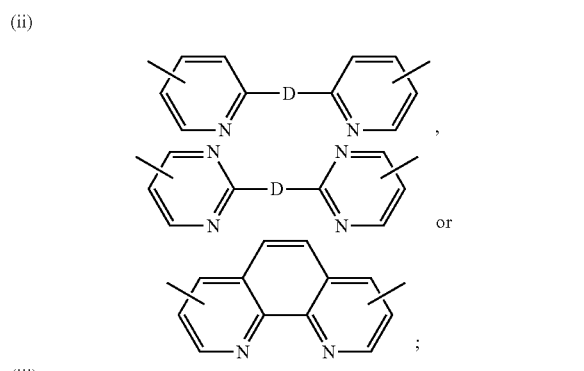

(iii)

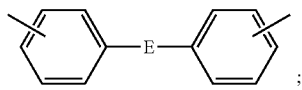

(iv)

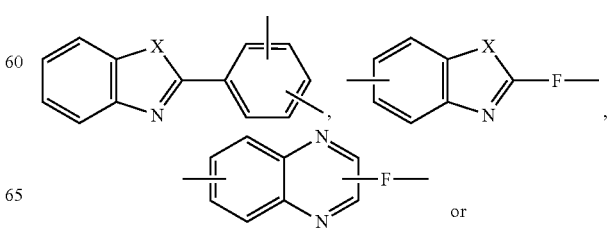

or

-continued

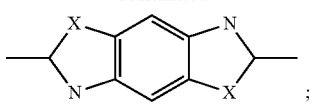

(v)

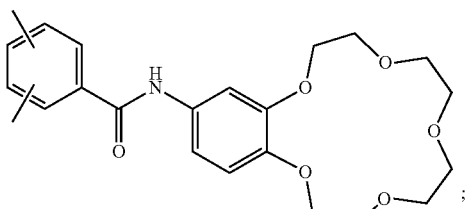

and
(vi) any combination of the above radicals,
wherein:
D is a bond, —NH—, —S—, —O—, phenylene or

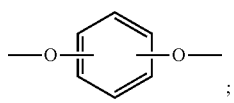

E is 5 or 6-membered nitrogen-containing heterocyclyl,

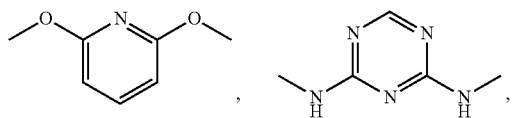

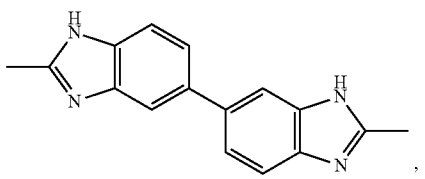

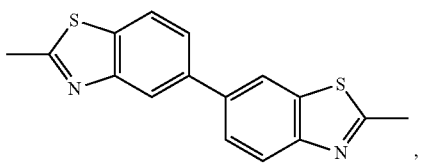

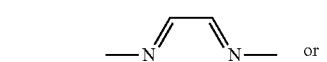

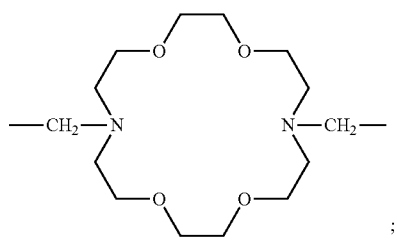

F is phenylene or

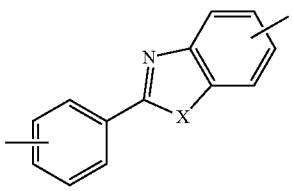

and
X is —NH—, —S— or —O—.

In one embodiment of the present disclosure, E is 5 or 6-membered nitrogen-containing heterocyclyl, preferably pyridyl, pyrimidinyl or triazoly, and more preferably

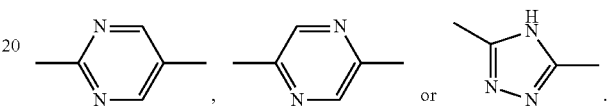

In one embodiment of the present disclosure, the above (i) radical can be pyridyl, pyrimidinyl, triazoly, oxadiazolyl or thiadiazolyl. Examples thereof include, but are not limited to,

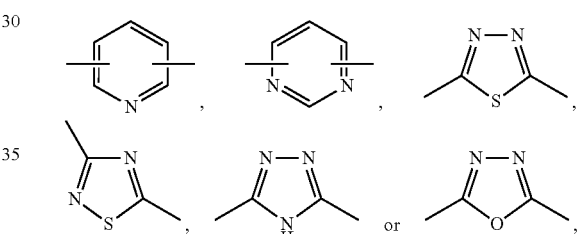

among which

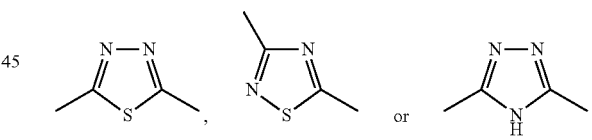

are preferable, and

is more preferable.

In one embodiment of the present disclosure, the above (ii) radical can be:

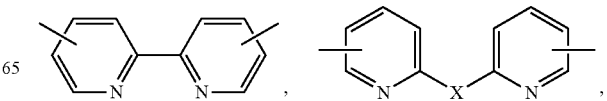

-continued
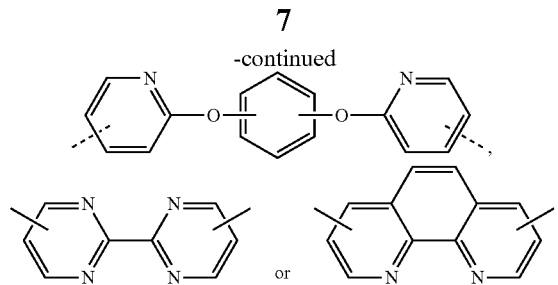
wherein X is as defined above.
The above-mentioned
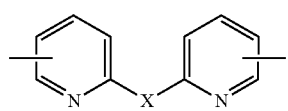
is preferably
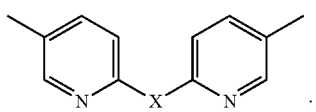
The above-mentioned
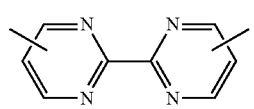
is preferably
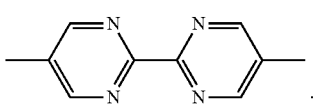
In one embodiment of the present disclosure, the above (iii) radical can be:
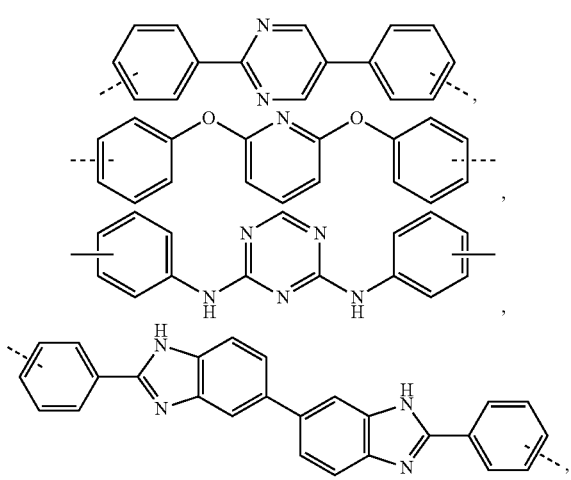
-continued
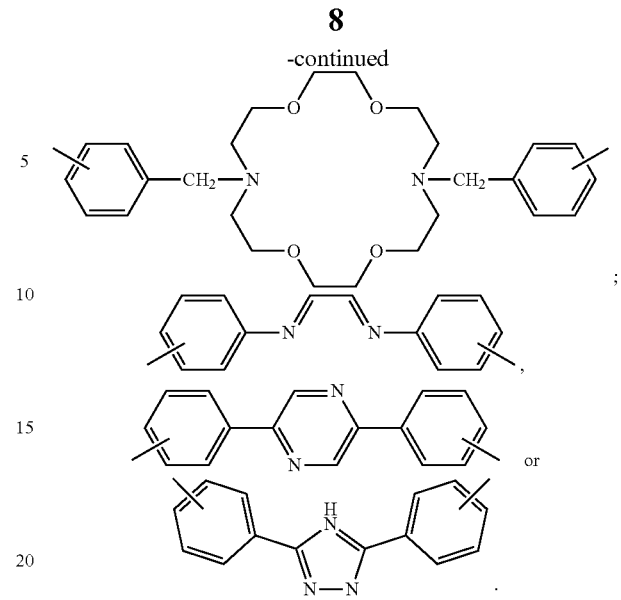
The above-mentioned
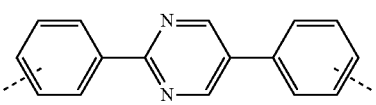
is preferably
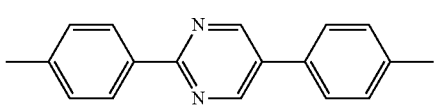
The above-mentioned
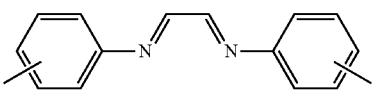
is preferably
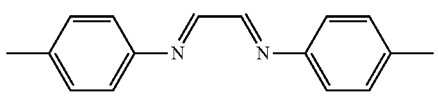
In one embodiment of the present disclosure, the above (iv) radical can be:
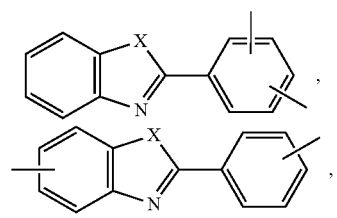

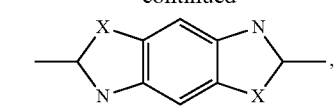
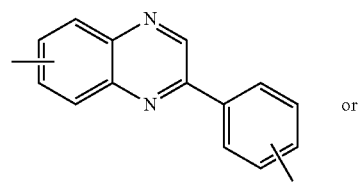
or
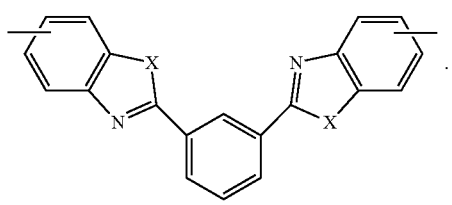
The above-mentioned
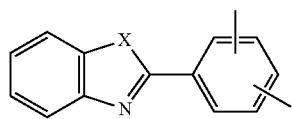
is preferably
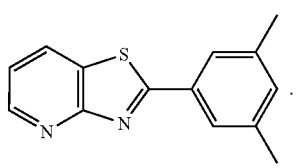 [SMILES: Cc1cc(C)cc(-c2nc3ncccc3s2)c1]
The above-mentioned
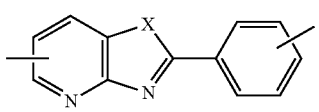
is preferably
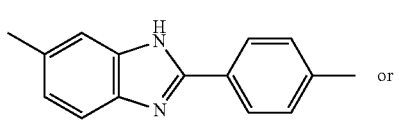
or
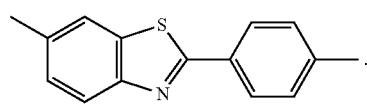
The above-mentioned
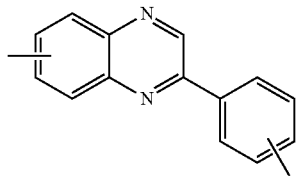
is preferably
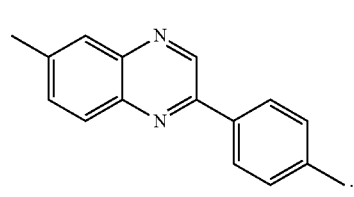
The above-mentioned
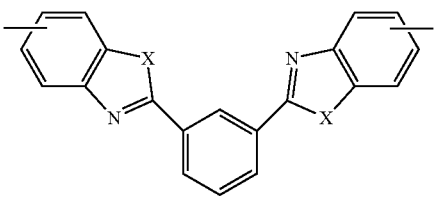
is preferably
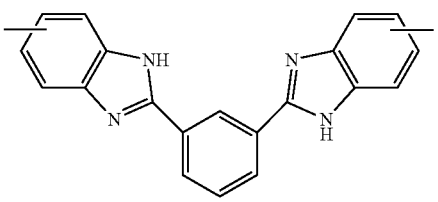
In one embodiment of the present disclosure, the above (v) radical can be:
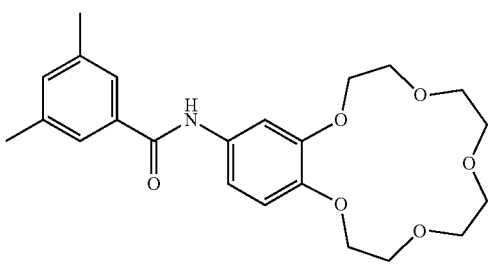

In one preferred embodiment of the present disclosure, the above (i) to (v) radicals can be any ligand that is capable of forming a coordinate bond with a metal ion and is preferably:

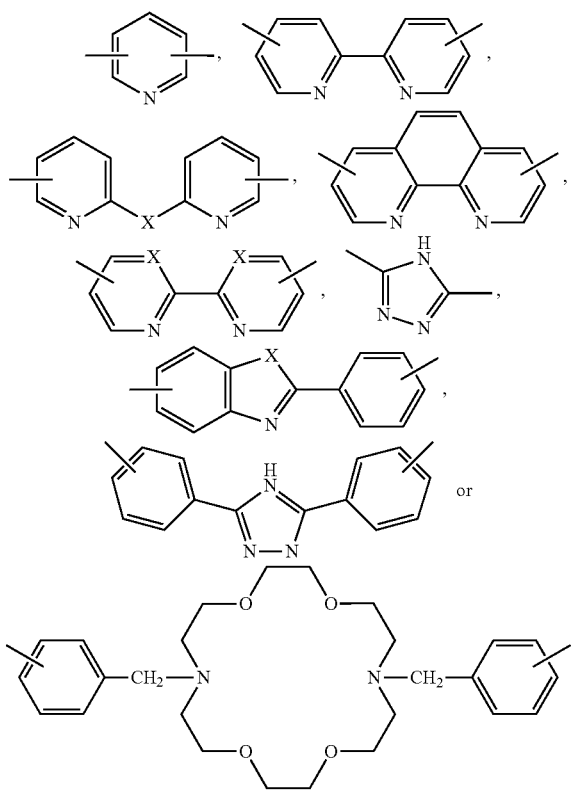

wherein X is as defined above.

More preferably, the above (i) to (v) radicals are bidentate ligands and in some embodiments of the present disclosure, the (i) to (v) radicals are:

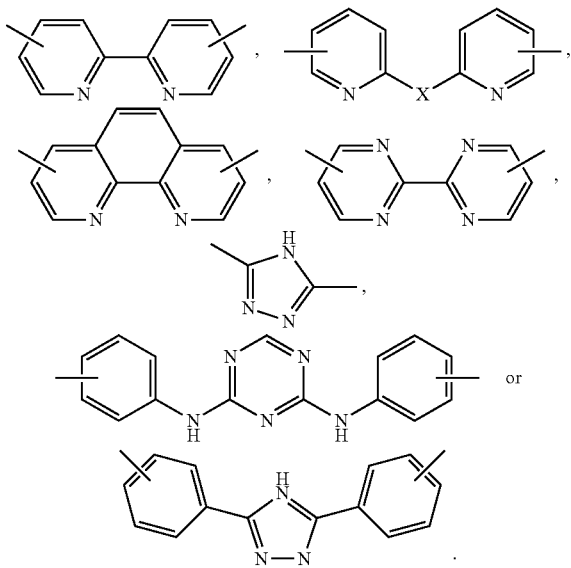

In one embodiment of the present disclosure, based on the total moles of the divalent organic groups P in the composition, the amount of the divalent organic groups that are capable of forming a coordinate bond with a metal ion is from about 0.5 mol % to about 25 mol %, such as 0.1, 0.5, 1, 2, 3, 4, 5, 6, 7, 8, 9, 10, 13 or 15 mol %, and is preferably from about 0.5 mol % to about 20 mol %, more preferably from about 1 mol % to about 15 mol %. The inventors of the present application have found that when the amount of the amount of the divalent organic groups that are capable of forming a coordinate bond with a metal ion is too low (for example, less than 0.5 mol %), the result of electroplating is not good and the adhesion between polyimide and metal (such as copper) is worse; however, when the amount of the divalent organic groups that are capable of forming a coordinate bond with a metal ion is too high (especially when higher than 25 mol %), the polyimide in the region without laser treatment may lose the required insulativity and have worse impedance when electrified in a reliability test in a high-temperature, high-humidity environment.

According to one embodiment of the present disclosure, in addition to the above-mentioned divalent organic group that is capable of forming a coordinate bond with a metal ion, the remaining divalent organic groups P may each independently a divalent aromatic group or divalent heterocyclic group other than the divalent organic group that is capable of forming a coordinate bond with a metal ion, which is preferably, selected from, for example, the following groups:

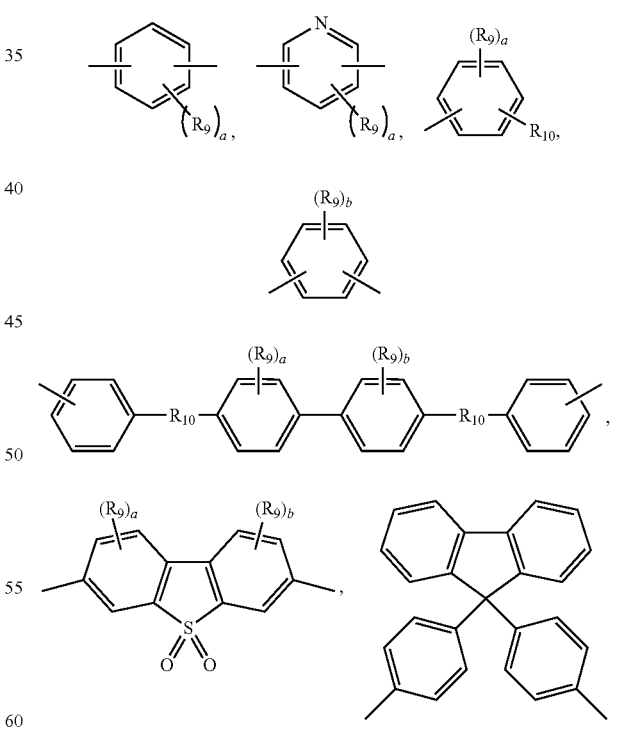

and a combination thereof, wherein each $R_9$ is independently H, $C_1$-$C_4$alkyl, $C_1$-$C_4$perfluoroalkyl, $C_1$-$C_4$alkoxyl or halogen; each a is independently an integer from 0 to 4; each b is independently an integer from 0 to 4; $R_{10}$ is a covalent bond, or selected from the following groups: —O—, —S—, —CH$_2$—, —S(O)$_2$—,

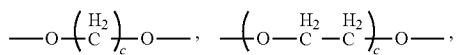

—C(CF$_3$)$_2$—, —C(CH$_3$)$_2$—,

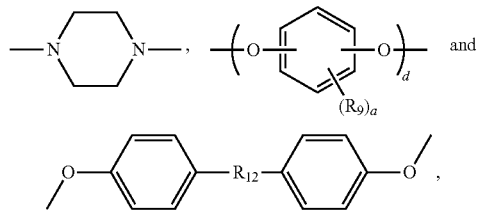 and wherein c and d are each independently an integer from 1 to 20, R$_{12}$ is —S(O)$_2$—, a covalent bond, C$_1$-C$_4$alkylene or C$_1$-C$_4$perfluoroalkylene.

The above-mentioned divalent aromatic group or divalent heterocyclic group other than the divalent organic group that is capable of forming a coordinate bond with a metal ion is more preferably selected from the following groups:

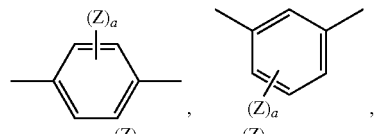,

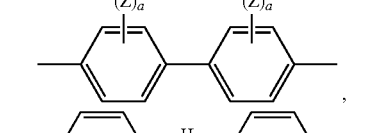,

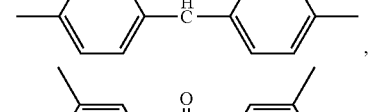,

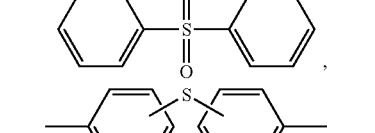,

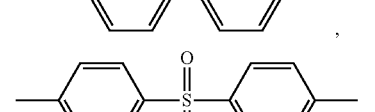,

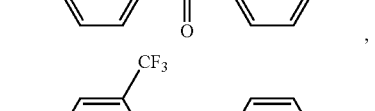,

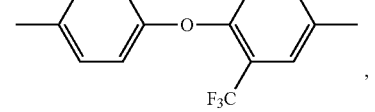,

,

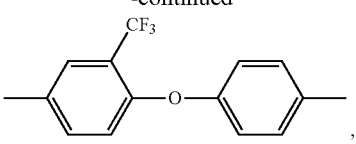,

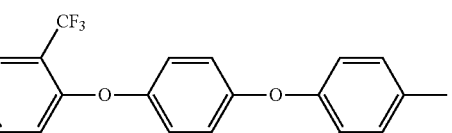,

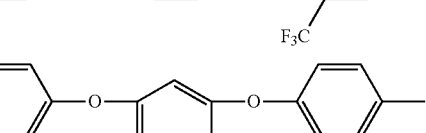,

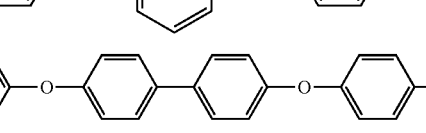,

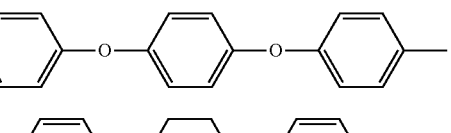,

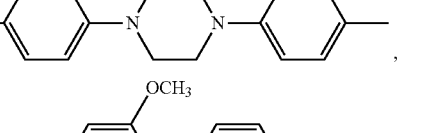,

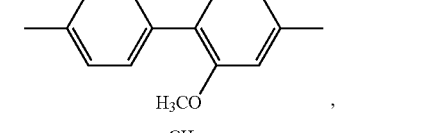,

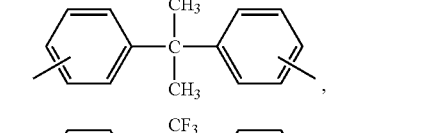,

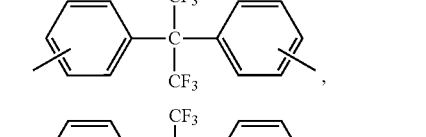,

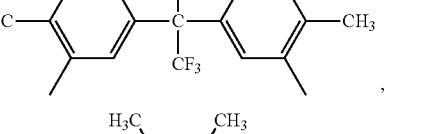,

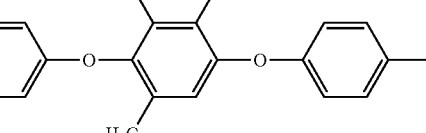,

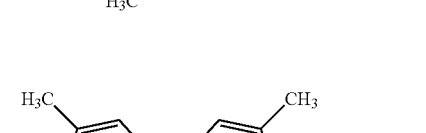,

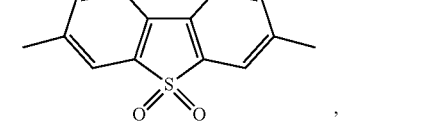,

-continued

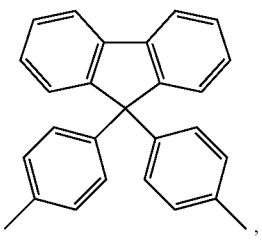,

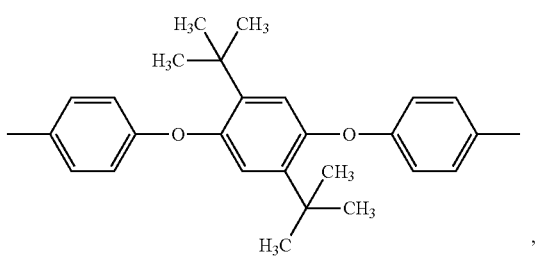,

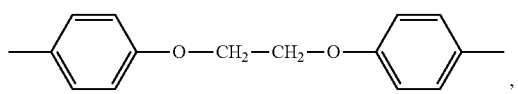,

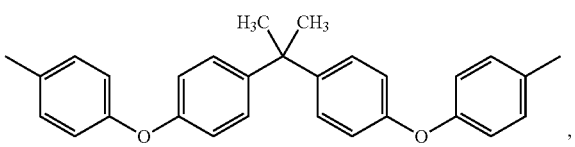,

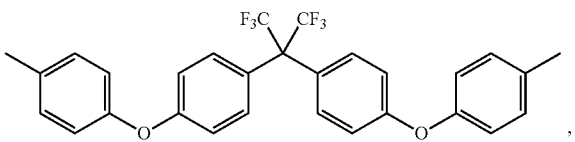,

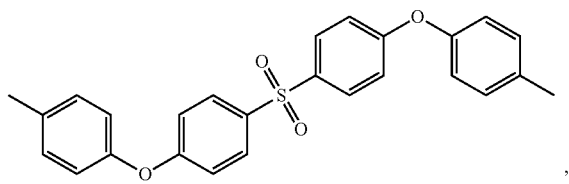,

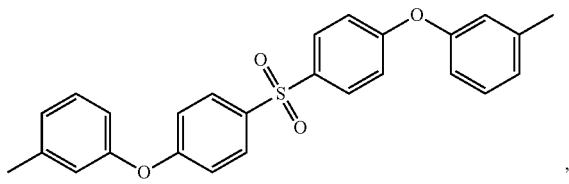,

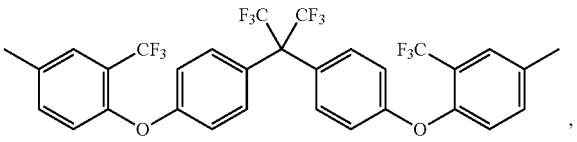,

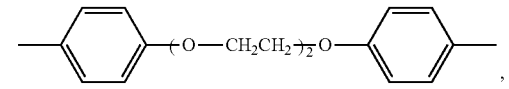,

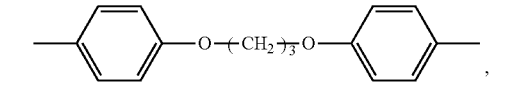,

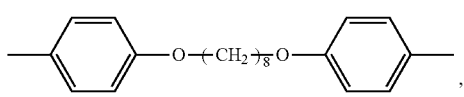,

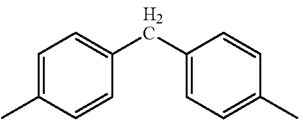

and a combination thereof,
wherein each a is independently an integer from 0 to 4, and each z is independently H, methyl, trifluoromethyl or halogen.

To allow the polyimide layer obtained after curing to have superior thermal stability, mechanical properties, electrical properties, and chemical resistance, the above-mentioned divalent aromatic group or divalent heterocyclic group other than the divalent organic group that is capable of forming a coordinate bond with a metal ion is most preferably selected from the following groups:

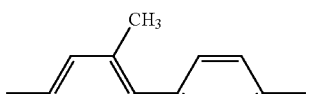,

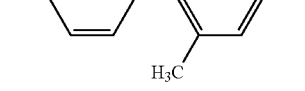,

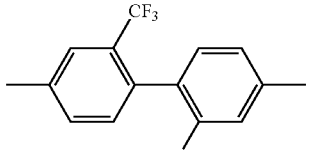,

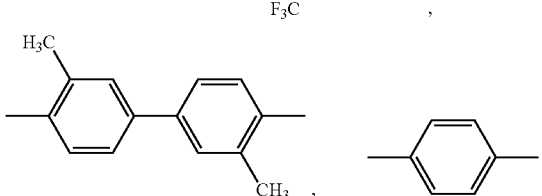,

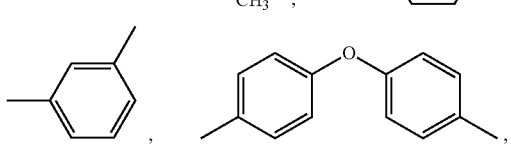,

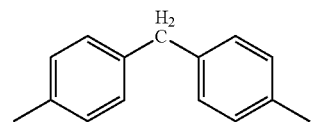

and a combination thereof.

According to one embodiment of the present disclosure, the divalent organic group P is not crosslinkable and the resulting polymer layer has superior flexural endurance when non-crosslinkable divalent organic group P is adopted.

According to one embodiment of the present disclosure, the ethylenically unsaturated group of R or $R_x$ is selected from the following groups: ethenyl, propenyl, methylpropenyl, n-butenyl, isobutenyl, ethenylphenyl, propenylphenyl, propenyloxymethyl, propenyloxyethyl, propenyloxypropyl, propenyloxybutyl, propenyloxypentyl, propenyloxyhexyl, methylpropenyloxymethyl, methylpropenyloxyethyl, methyl propenyloxypropyl, methylpropenyloxybutyl, methylpropenyloxypentyl, methylpropenyloxyhexyl or a group of the following formula (B):

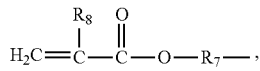
(B)

wherein $R_7$ is phenylene, $C_1$-$C_8$alkylene, $C_2$-$C_8$alkenylene, $C_3$-$C_8$cycloalkylene or $C_1$-$C_8$hydroxylalkylene; and $R_8$ is hydrogen or $C_1$-$C_4$alkyl.

According to one embodiment of the present disclosure, each R is independently selected from the following groups:

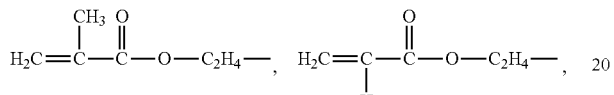

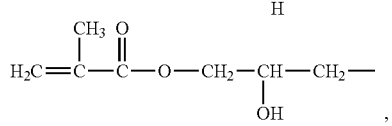

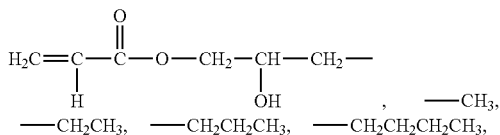

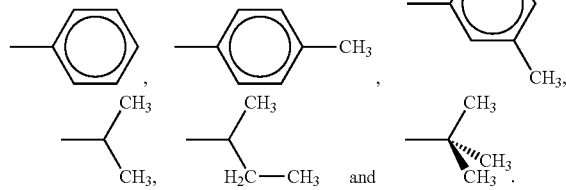

According to one preferred embodiment of the present disclosure, each $R_x$ is independently H, methyl, ethyl, propyl, 2-hydroxypropyl methacrylate, ethyl methacrylate, ethyl acrylate, propenyl, methylpropenyl, n-butenyl or isobutenyl, more preferably H or methyl.

According to one embodiment of the present disclosure, G is tetravalent aromatic group and is preferably and independently selected from the following groups:

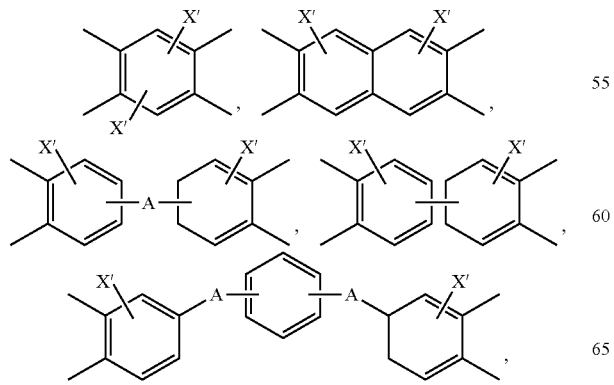

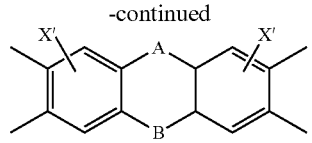

and a combination thereof.

wherein each X' is independently H, halogen, $C_1$-$C_4$perfluoroalkyl, $C_1$-$C_4$alkyl; and A and B are independently, at each occurrence, a covalent bond, $C_1$-$C_4$alkylene unsubstituted or substituted with one or more radicals selected from $C_1$-$C_4$alkyl, $C_1$-$C_4$perfluoroalkylene, $C_1$-$C_4$alkoxylene, silylene, —O—, —S—, —C(O)—, —OC(O)—, —S(O)$_2$—, —C(=O)O—($C_1$-$C_4$alkylene)-OC(=O)—, phenylene, biphenylene or

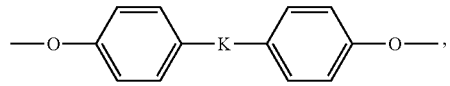

wherein K is —O—, —S(O)$_2$—, $C_1$-$C_4$alkylene or $C_1$-$C_4$ perfluoroalkylene.

G is more preferably selected from the group consisting of:

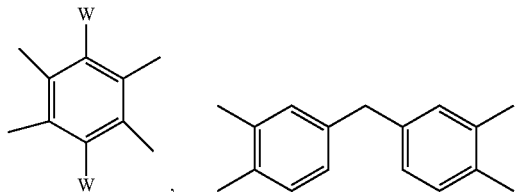

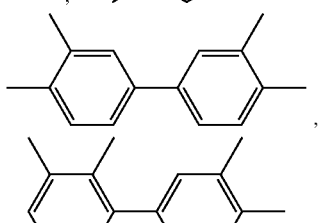

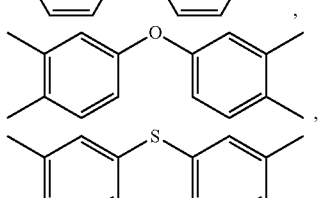

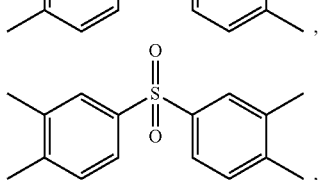

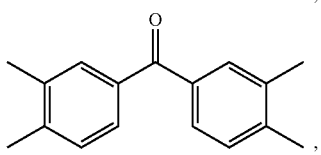

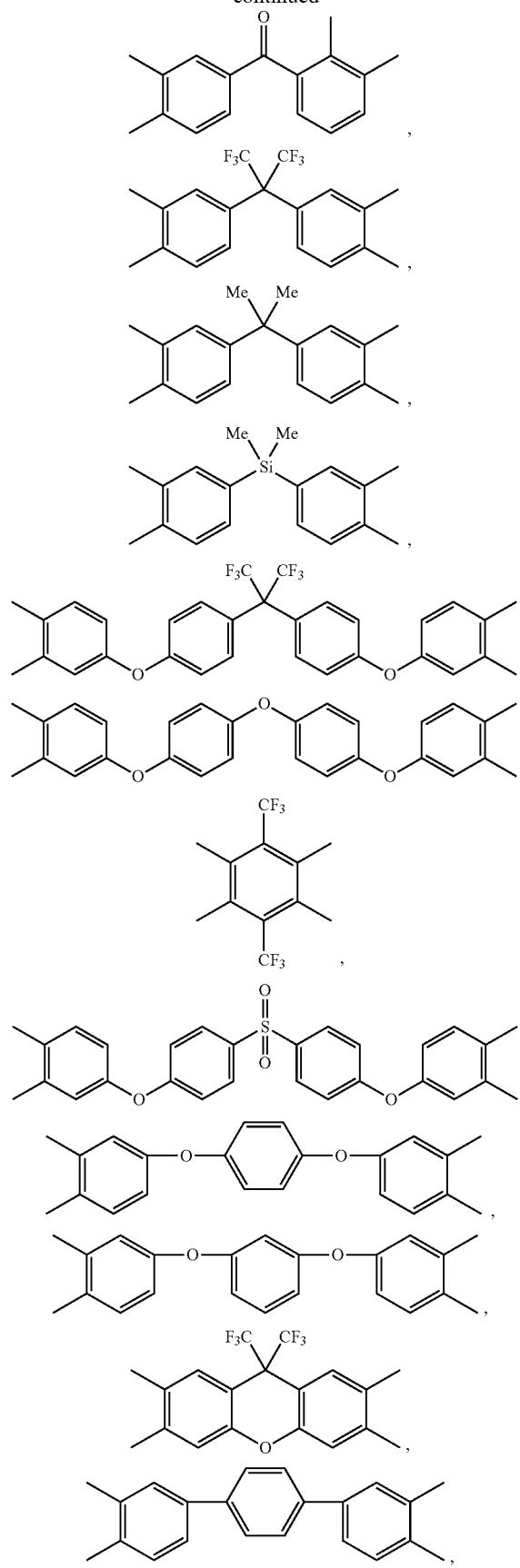

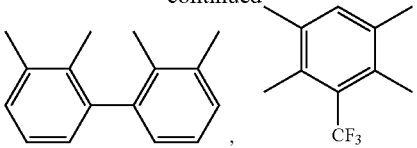

and a combination thereof.
wherein each W is independently methyl, trifluoromethyl or halogen.

To allow the polyimide layer obtained after during to have superior thermal stability, mechanical properties, electrical properties, and chemical resistance, G is most preferably a tetravalent aromatic group selected from the group consisting of:

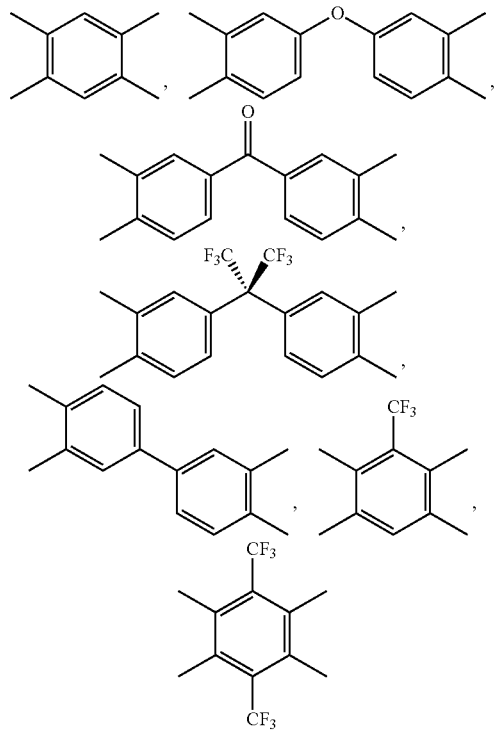

and a combination thereof.

The amic acid ester oligomer of formula (I) of the present disclosure may be prepared by the following method, without limitation thereto:

(a) reacting a dianhydride of formula (7) in an excess amount with a compound having hydroxyl (R—OH) to form a compound of formula (8);

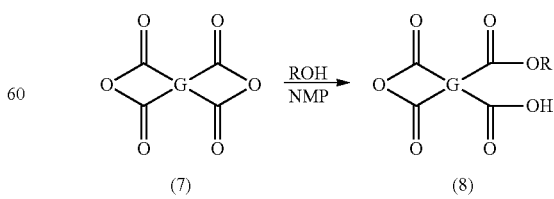

(b) after carrying out the reaction of step (a), adding a diamine monomer (e.g., a diamine compound of formula H$_2$N—P—NH$_2$) to react with the compounds of formulae (7) and (8) and form a compound of formula (11); and

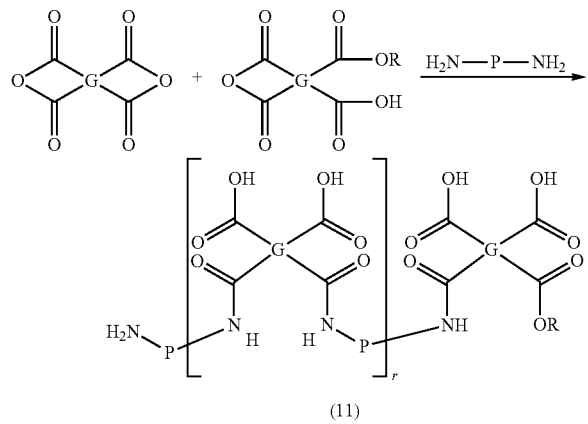

(11)

(c) optionally adding one or more compounds having a group R$_x$ (e.g. epoxy acrylate,

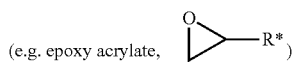

(e.g. epoxy acrylate, for carrying out reaction to form the amic acid ester oligomer of formula (I)

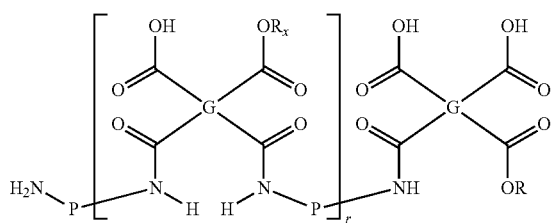

wherein R, P, R$_x$, G and r are as defined hereinbefore.

According to one embodiment of the present disclosure, the polyimide precursor composition may optionally comprise a metal adhesion promoter. A metal adhesion promoter (e.g., copper adhesion promoter) can form a complex with metal (e.g., copper), thereby enhancing the adhesion between metal and a polyimide resin layer.

The above-mentioned metal adhesion promoters can be nitrogen-containing heterocycles, for example, 5 to 6-membered heterocycles containing 1 to 3 nitrogen atoms, such as imidazoles, pyridines or triazoles; or fused ring compounds containing any of the above-mentioned nitrogen-containing heterocycles in structure. The above nitrogen-containing heterocycles can be unsubstituted or substituted by one to three substituent group. The substituent group can be, for example, but is not limited to hydroxyl or 5 to 6-membered heterocyclyl containing 1 to 3 nitrogen atoms. According to the present disclosure, the metal adhesion promoter, if present, is in an amount of about 0.1 parts by weight to about 2 parts by weight based on 100 parts by weight of the total resin in the polyimide precursor composition, and is preferably in an amount of about 0.2 parts by weight to about 1.5 parts by weight based on 100 parts by weight of the total resin in the polyimide precursor composition.

Examples of the metal adhesion promoter include, but are not limited: 1,2,3-triazole, 1,2,4-triazole, 3,5-diamino-1,2,4-triazole, imidazole, benzimidazole, 1,2,3,4-tetrahydrocarbazole, 2-hydroxybenzimidazole, 2-(2-hydroxyphenyl)-1H-benzimidazole, 2-(2-pyridyl)-benzimidazole, 2-(3-pyridyl)-1H-benzimidazole or a combination thereof.

In order to lower the cyclization temperature for producing polyimide such that the amic acid ester oligomer (i.e., the polyimide precursor) can be imidized at a lower temperature (for example, not higher than 300° C. or not higher than 250° C.) to form polyimide, the polyimide precursor composition of the present disclosure may optionally comprise a cyclization promoter. The cyclization promoter can generate a base upon heating to provide a base environment so as to facilitate the polymerization, cyclization and imidization of the amic acid ester oligomer of formula (I) into polyimide. Therefore, adding a cyclization promoter into a polyimide precursor composition is beneficial to lower the cyclization temperature.

The cyclization promoter of the present disclosure has the following formula:

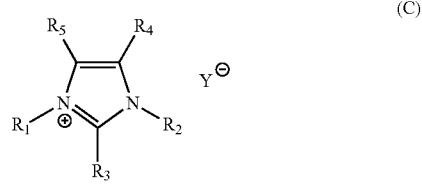

(C)

wherein R$_1$ and R$_2$ are the same or different and are each independently C$_1$-C$_6$alkyl, C$_1$-C$_6$haloalkyl, or C$_1$-C$_6$alkyl substituted with one or more C$_6$-C$_{14}$aryl,

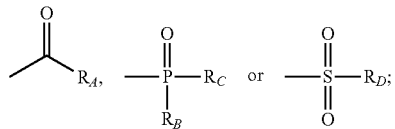

R$_A$ is C$_1$-C$_6$alkyl, C$_1$-C$_6$haloalkyl, C$_1$-C$_8$alkoxy unsubstituted or substituted with one or more C$_6$-C$_{14}$aryl, or —NR$_E$R$_F$; R$_B$, R$_C$, R$_D$, R$_E$ and R$_F$ are the same or different, and are each independently H, C$_1$-C$_{14}$alkyl unsubstituted or substituted with one or more C$_6$-C$_{14}$aryl, or C$_6$-C$_{14}$ aryl; R$_3$, R$_4$ and R$_5$ are the same or different, and are each independently H, C$_1$-C$_6$alkyl unsubstituted or substituted with one or more C$_6$-C$_{14}$aryl, C$_1$-C$_6$ hydroxyalkyl, C$_1$-C$_6$cyanoalkyl, or C$_6$-C$_{14}$aryl; Y$^\ominus$ is an anionic group.

According to an embodiment of the present disclosure, the groups R$_1$ and R$_2$ in formula (C) are the same or different and are each independently C$_1$-C$_6$alkyl,

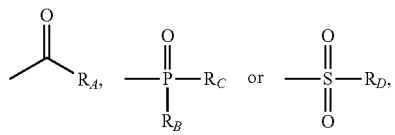

wherein R$_A$ is C$_1$-C$_6$alkyl, C$_1$-C$_6$haloalkyl, C$_1$-C$_8$alkoxy unsubstituted or substituted with one or more C$_6$-C$_{14}$aryl, or —NR$_E$R$_F$; and R$_B$, R$_C$, R$_D$, R$_E$ and R$_F$ are the same or different and are each independent H, $C_1$-$C_{14}$alkyl, or $C_6$-$C_{14}$aryl. Preferably, $R_A$ is methyl, ethyl, n-propyl, isopropyl, n-butyl, isobutyl, tert-butyl, pentyl, hexyl, trifluoromethyl, pentafluoethyl, methoxy, ethoxy, propoxy, butoxy, pentyloxy, hexyloxy, benzyloxy and fluorenylmethoxy; and $R_B$, $R_C$, $R_D$, $R_E$ and $R_F$ are each independently H, methyl, ethyl, n-propyl, isopropyl, n-butyl, isobutyl, tert-butyl, pentyl, hexyl, heptyl, octyl, phenyl, benzyl or diphenylmethyl.

According to one embodiment of the present disclosure, the groups $R_1$ and $R_2$ in formula (C) are the same or different and are each independently methyl, ethyl, propyl, butyl or selected from a group consisting of:

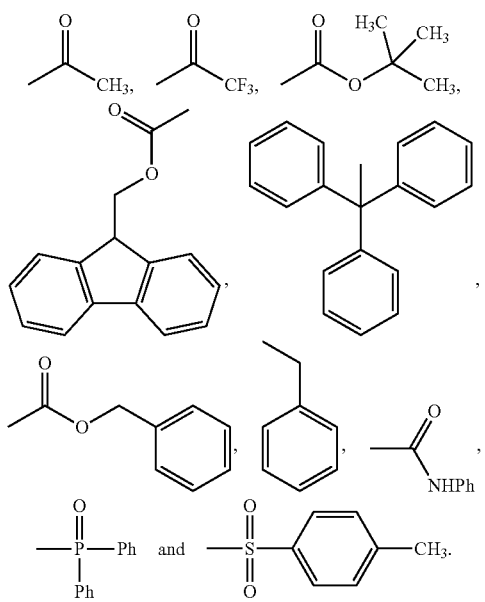

Preferably, $R_1$ and $R_2$ are the same or different and are each independently methyl, ethyl or selected from a group consisting of:

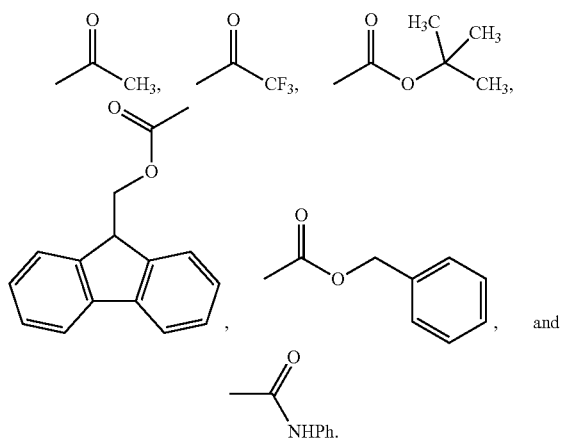

According to one embodiment of the present disclosure, $R_3$, $R_4$ and $R_5$ in formula (C) are the same or different and are each independently H, methyl, ethyl, n-propyl, isopropyl, n-butyl, isobutyl, tert-butyl, pentyl, hexyl, hydroxymethyl, hydroxyethyl, hydroxypropyl, hydroxybutyl, hydroxypentyl, hydroxyhexyl, cyanomethyl, cyanoethyl, cyanopropyl, cyanobutyl, cyanopentyl, cyanohexyl, phenyl, benzyl or diphenylmethyl. Hydroxybutyl is preferably

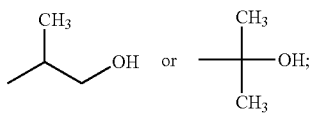

hydroxypentyl is preferably

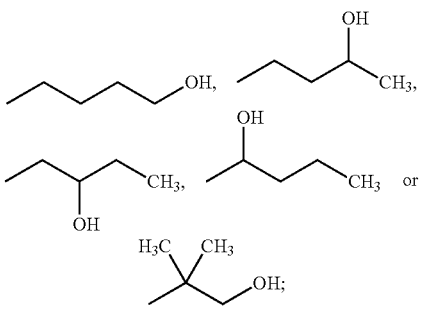

cyanobutyl is preferably

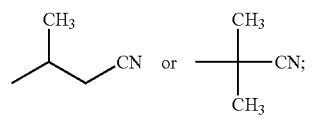

cyanopentyl is preferably

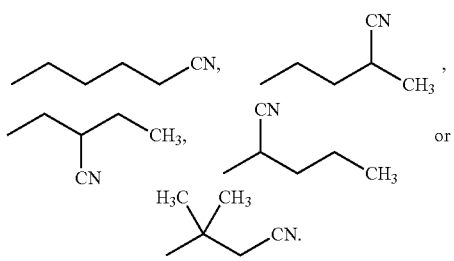

Preferably, $R_3$, $R_4$ and $R_5$ are the same or different and are each independently H, methyl, ethyl, n-propyl or isopropyl.

The anionic group in formula (C) is not particularly limited, examples thereof including, but not limited to, halide ion, sulfate, nitrate, phosphate, sulfonate, carbonate, tetrafluoborate, borate, chlorate, iodate, hexafluorophosphate, perchlorate, trifluoromethanesulfonate, trifluoroacetate, acetate, tert-butylcarbonate, $(CF_3SO_2)_2N^-$ or tert-butyloxy. According to one embodiment of the present disclosure, the anionic group in formula (C) is halide ion or tetrafluoborate. Preferably, the halide ion is fluoride ion and chloride ion.

According to one embodiment of the present disclosure, the cyclization promoter, if present, is in an amount of about 0.1 parts by weight to about 2 parts by weight, preferably about 0.2 parts by weight to about 1.5 parts by weight, based on 100 parts by weight of the amic acid ester oligomer.

According to one embodiment of the present disclosure, the polyimide precursor composition of the present disclosure may comprise a solvent. For example, the solvent may be selected from the group consisting of (without limitation thereto): dimethyl sulfoxide (DMSO), diethyl sulfoxide, N,N-dimethyl-methanamide (DMF), N,N-diethyl-methanamide, N,N-dimethylacetamide (DMAc), N,N-diethylacetamide, N-methyl-2-pyrrolidone (NMP), N-ethyl-2-pyrrolidone (NEP), N-vinyl-2-pyrrolidone (NVP), phenol, o-cresol, m-cresol, p-cresol, xylenol, halogenated phenol, pyrocatechol, tetrahydrofuran (THF), dioxane, dioxolane, propylene glycol monomethyl ether (PGME), tetraethylene glycol dimethyl ether (TGDE), methanol, ethanol, butanol, 2-butoxyethanol, γ-butyrolactone (GBL), xylene, toluene, hexamethylphosphoramide, propylene glycol monomethyl ether acetate (PGMEA) and a mixture thereof. The solvent is preferably a polar aprotic solvent, for example, a solvent selected from the following groups: dimethyl sulfoxide (DMSO), diethyl sulfoxide, N,N-dimethyl-methanamide (DMF), N,N-diethyl-methanamide, N,N-dimethylacetamide (DMAc), N,N-diethylacetamide, N-methyl-2-pyrrolidone (NMP), N-ethyl-2-pyrrolidone (NEP), γ-butyrolactone (GBL).

According to one embodiment of the present disclosure, the amount of the amic acid ester oligomer is about 10 wt % to about 70 wt %, and preferably about 15 wt % to about 50 wt %, based on the total weight of the polyimide precursor composition; the remaining is solvent. The amount of the solvent is not particularly limited and can be used to make it easy to apply the composition.

The method for preparing the polyimide precursor composition of the present disclosure is not particularly limited. For example, the polyimide precursor composition of the present disclosure can be prepared by adding a suitable solvent and optional additives (for example, an copper adhesion promoter, a cyclization promoter, or other suitable additives (such as a leveling agent, a defoaming agent, a coupling agent, a dehydrating agent, a catalyst, etc.)) in an appropriate proportion, after the preparation of the polyimide precursor of formula (I), and agitating the mixture in a nitrogen system.

The present disclosure further provides a polyimide produced from the above polyimide precursor composition.

The polyimide of the present disclosure can be obtained by coating the above polyimide precursor composition on a substrate and cyclizing the polyimide precursor upon heating. The polyimide of the present disclosure is thermosetting polyimide and has excellent physical properties and mechanical properties and low thermal coefficient of expansion. The substrate can be any substrate known to persons having ordinary skill in the art, such as metal foil, glass or plastic. The metal foil can be, for example, cooper foil. The plastic substrate is not particularly limited, which includes, for example, but is not limited to, polyester resins, such as polyethylene terephthalate (PET) and polyethylene naphthalate (PEN); polymethacrylate resins, such as polymethyl methacrylate (PMMA); polyimide resins; polystyrene resins; polycycloolefin resins; polyolefin resins; polycarbonate resins; polyurethane resins; triacetate cellulose (TAC); or a mixture thereof. The preferred substrate is polyethylene terephthalate, polymethyl methacrylate, polycycloolefin resin, or triacetate cellulose, or a mixture thereof. More preferably, the substrate is polyethylene terephthalate. The thickness of the substrate usually depends on the purpose of a desired electronic product and is preferably in the range from about 16 μm to about 250 μm.

In a conventional method for synthesizing polyimides, a high molecular weight polyamic acid needs to be synthesized first as a precursor. However, because of the high molecular weight, the viscosity is too large, resulting in poor operability and the potential occurrence of poor leveling upon coating and other shortcomings. In addition, when the polyamic acid precursor with an overly high molecular weight is imidized, the interaction between molecules and the shortening of the molecular chain length result in great internal stress, causing warpage and deformation of a film coated on the substrate.

The amic acid ester oligomer of the present disclosure is characterized by having both an ester group (—C(O)OR) and a carboxyl group (—C(O)OH) as terminal groups, and being in a meta-stable status, so it does not react with its own amino group (—NH$_2$) at room temperature. Moreover, due to the low molecular weight, the operability is good, and the effect of leveling can be achieved upon coating. During the post curing process, the temperature is elevated to 100° C. or above, the terminal ester group and carboxyl group are reduced into anhydride by the amino group, and then polymerization occurs to form a larger polymer, which is then polycondensated to provide a polyimide having excellent thermal properties, mechanical properties and tensile properties. Compared with the high-viscosity high-molecular-weight polyamic acid used in the prior art, the amic acid ester oligomer with a low viscosity is used as a precursor in the present disclosure, so that good operability and high leveling property are exhibited upon coating. When the precursor composition of the present disclosure is imidized, the amic acid ester oligomer contained therein undergoes intramolecular cyclization and then intermolecular polymerization and cyclization, whereby internal stress remaining in the polyimide is effectively reduced, and the resulting polyimide has the advantage of not warping.

Compared with the conventional polyamic acid, the polyimide precursor (amic acid ester oligomer) of the present disclosure has lower molecular weight, lower viscosity, and better operability, and can be formulated to have a high solid content. In this case, the coating contains less solvent, so the soft baking time is shortened and the soft baking temperature is reduced. Therefore, the volume shrinkage caused by evaporation of a large amount of solvent is alleviated, and the advantages, such as fast film-forming speed upon drying and reduced number of coating layers which are required to achieve the desired thickness of the product, exist.

Polyimide is generally an insulator, so it is impossible to make a metal layer or metal circuit on polyimide directly. Attempts have been made in the industry to metallize polyimide by sputtering or electroless plating to make the surface of the polyimide become a conductor, and then conducting electroplating. However, the cost of sputtering is high, and most of the electroless plating solutions contain toxic substances or are unstable in nature so the operation is inconvenient. In addition, even after being irradiated with laser light, polyimide is generally still non-conductive such that in the subsequent metal plating process, the metal circuit tends to be concave due to insufficient amount of metal plated.

The polyimide of the present disclosure contains, in its structure, the aforementioned particular divalent organic groups that can form a coordinate bond with a metal ion, such as copper ion. The divalent organic groups contain a lone pair of electrons, can be activated upon plasma or laser irradiation and function as a chelating agent to form a stable complex with the metal ion from the solution. Metal ions are firmly attached to the irradiated region, making the region conductive, such that a subsequent metal ion reduction and electroplating process can be carried out. Conversely, although the non-irradiated region contains the aforementioned particular divalent organic groups that can form a coordinate bond with a metal ion (e.g., copper ion), the divalent organic groups are not activated, and metal ions cannot be firmly attached thereto, so the subsequent metal ion reduction and electroplating process cannot be carried out. Therefore, by using the polyimide of the present disclosure, a patterned metal layer or circuit can be prepared by creating an activated and non-activated region via plasma or laser irradiation.

By using the polyimide precursor composition and the polyimide of the present disclosure, not only is the problem of poor adhesion between the polyimide and the plated metal layer in the conventional wet chemistry solved effectively, but also the problem of poor dispersion of the conductive particles or poor impedance in the non-activated region in the prior art, since no conductive particles or conductive precursor needs to be added to the precursor composition.

Compared with the conventional exposure and development technology (subtractive fabrication), the LDI technology achieves the additive fabrication of a patterned metal layer or circuit, and the fabrication time is greatly shortened. Further, the technology permits quick adjustments and modifications, thereby reducing errors and lowering cost. The polyimide precursor composition and polyimide of the present disclosure are particularly suitable for use in the fabrication of circuits or other electrical devices in the integrated circuit industry, semiconductor manufacturing process, or flexible printed circuit board and other technical areas. The polyimide of the present disclosure is applicable to a plasma or laser direct imaging process (preferably a laser direct imaging process), in which polyimide in a particular region is activated by irradiating the particular region by computer-controlled laser or plasma scanning, and then a metal is, for example, electroplated on the specific region to form a patterned metal layer, a circuit or other electrical device.

The present disclosure further provides use of the polyimide precursor composition in the preparation of a polyimide which can be activated in a plasma or laser direct imaging process.

The plasma may be gas plasma. For example (but not limited thereto), the irradiation can be carried out by using oxygen ($O_2$) plasma with proper power settings (for example, 1000 W to 1500 W for 3 to 5 minutes).

The laser may be, without limitation, Nd-YAG laser or $CO_2$ laser.

Preferred embodiments of the present disclosure are disclosed as above, which, however, are provided for further illustrating instead of limiting the scope of the present disclosure. Any modifications and variations easily made by those of skill in the art are contemplated within the disclosure of the specification and the scope of the appended claims of the present disclosure.

EXAMPLES

The abbreviations mentioned in examples below are defined as follows:

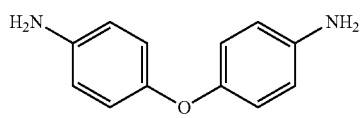
DA-1

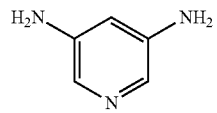
DA-2

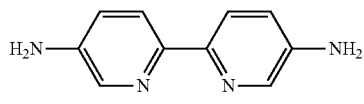
DA-3

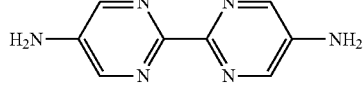
DA-4

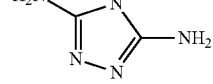
DA-5

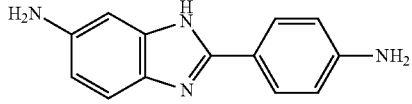
DA-6

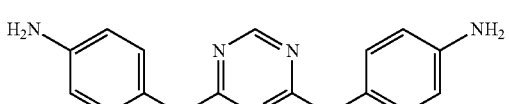
DA-7

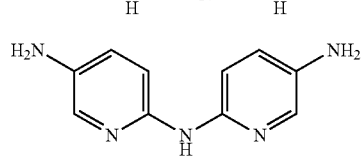
DA-8

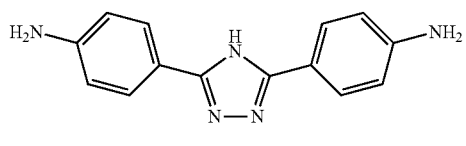
DA-9

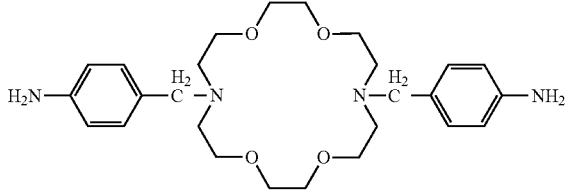
DA-10

Preparation Example 1

0.5 mol of 4,4'-Biphthalic dianhydride (BPDA) was placed in a nitrogen-filled 1 L reactor, and 400 ml of NMP was added and stirred at 50° C. for 1 hr. Then, 0.495 mol of DA-1 and a suitable amount of NMP were further added and stirred for 12 hrs. After the temperature was warmed to 25° C., 0.005 mol of DA-1 was added and stirred for 2 hrs. NMP was further added to adjust the solid content to 15%, to obtain a polyimide precursor composition (100 mol % DA-1).

Preparation Example 2

0.5 mol of BPDA was placed in a nitrogen-filled 1 L reactor, and 400 ml of NMP was added and stirred at 50° C.

for 1 hr. Then, 0.499 mol of DA-1 and a suitable amount of NMP were further added and stirred for 12 hrs. After the temperature was warmed to 25° C., 0.001 mol of DA-2 was added and stirred for 2 hrs. NMP was further added to adjust the solid content to 15%, to obtain a polyimide precursor composition (99.8 mol % DA1).

Analogously, the ratio of DA-1 and DA-2 was adjusted (such that the amount of DA-1 accounts for 99.5 mol %, 99 mol %, 95 mol %, 90 mol %, 85 mol %, 80 mol % and 75 mol % of the total amount of DA-1 and DA-2), to obtain polyimide precursor compositions containing various contents of DA-1 in mol %.

Preparation Examples 3 to 10

The process was the same as that in Preparation Example 2, except that DA-3 to DA-10 were used, respectively, instead of DA-2 in Preparation Example 2.

Example

The polyimide precursor compositions obtained in Preparation Examples 2 to 10 were coated at a coating thickness of 50 μm onto a 25×25 cm copper foil having a thickness of 18 μm by using a slit coater. Then, the coating was soft baked for 15 min in an oven at about 90° C. to give a non-sticky surface, and then placed in a high temperature oven for two times of heat treatment which are carried out at 150° C. for 1 hr and at 350° C. for 2 hrs, respectively, so that the polyimide precursor in the coating was cyclized and polymerized into polyimide, and a sample to be tested (where the thickness of the coating after drying was 25 μm) were prepared.

Comparative Example

The process was the same as that in the example, except that the polyimide precursor composition obtained in Preparation Example 1 was used to prepare the sample to be tested.

Test Methods

1. Peel Strength (Adhesion) Test

The surface of the polyimide layer of the sample to be tested was treated with Nd-YAG laser to give a surface roughness of greater than 0.1 μm. The treated sample was soaked for 30 min in a 2 M aqueous copper sulfate solution at 50° C., washed with pure water and then soaked for 10 min in a 1 M aqueous diaminoborane solution (DiaminoBorane (aq), $NH_2$—BH—$NH_2$) at 25° C., washed with pure water, and dried. The thickness of copper was increased to 30 μm by electroplating (the electroplating solution: 70 g/L of copper sulfate, 200 g/L, of sulfuric acid, 50 mg/L of chloride ion, and 5 mL/L of plating additive (LUCINA SF-M, Okuno Chemical Industries Co., Ltd.), the electroplating temperature was 25° C., and the cathode current density was 3 $A/dm^2$).

(1-1): According to ASTM D3359-93 test method, the surface of the coating was cut with a cross hatch cutter, and then attached with an adhesive tape. Then, the tape was peeled up at an angle of 90°, and the number of grids peeled off was determined. The adhesion strengths are ranked as follows: 5B>4B>3B>2B>1B>0B.

(1-2): After the sample was baked at 280° C. for half an hour, the sample was cut into a test strip of 15 cm×1 cm. The polyimide layer at the end of the test strip was slightly separated from the plated copper layer. According to IPC-TM-650 test method (Number 2.4.9), the peel strength was measured. The peel strength is accepted if it is greater than 0.5 Kg/cm.

The test results are recorded in Tables 1 and 2.

Plating Thickness Test

The sample was irradiated with Nd-YAG laser to prepare a groove having a length of 10 cm, a width of 50 μm and a depth of 25 μm. The treated sample was soaked for 30 min in a 2 M aqueous copper sulfate solution at 50° C., washed with pure water and then soaked for 10 min in a 1 M aqueous diaminoborane solution (DiaminoBorane (aq), $NH_2$—BH—$NH_2$) at 25° C., washed with pure water, and dried. Electroplating was carried out with the plating thickness set to 10 μm. The electroplating solution includes 70 g/L of copper sulfate, 200 g/L of sulfuric acid, 50 mg/L of chloride ion, and 5 mL/L of plating additive (LUCINA SF-M, Okuno Chemical Industries Co., Ltd.), the electroplating temperature was 25° C., and the cathode current density was 3 $A/dm^2$.

The plated sample was rinsed with water, dried, and sliced. The sample was observed by SEM and the thickness of the plated copper was measured at the bottom and sidewalls of the grooves and on the surface of the polyimide layer without laser treatment, where the evaluation was carried out at a middle position on the bottom, sidewall and the untreated surface. FIG. 1 is a schematic cross-sectional view of a sliced electroplated sample, in which the sample has a groove 11 (i.e., the region defined by the sidewalls $S_1$ and the bottom $S_2$) produced on the polyimide layer 10 by laser irradiation, a surface $S_u$ of the polyimide layer without laser treatment, and a copper foil 20 exposed at the bottom of the groove.

The test result is shown in Table 3.

Test Results

TABLE 1

| | DA-1, mol % | | | | | | | | |
|---|---|---|---|---|---|---|---|---|---|
| | 100% | 99.8% | 99.5% | 99% | 95% | 90% | 85% | 80% | 75% |
| DA-1 | 0B (Comparative Example) | — | — | — | — | — | — | — | — |
| DA-2 | — | 4B | 4B | 4B | 4B | 5B | 5B | 5B | 5B |
| DA-3 | — | 4B | 4B | 4B | 5B | 5B | 5B | 5B | 5B |
| DA-4 | — | 4B | 5B | 5B | 5B | 5B | 5B | 5B | 5B |
| DA-5 | — | 4B | 4B | 5B | 5B | 5B | 5B | 5B | 5B |
| DA-6 | — | 4B | 5B | 5B | 5B | 5B | 5B | 5B | 5B |

TABLE 1-continued

| | \multicolumn{8}{c}{DA-1, mol %} |
|---|---|---|---|---|---|---|---|---|
| | 100% | 99.8% | 99.5% | 99% | 95% | 90% | 85% | 80% | 75% |
| DA-7 | — | 4B | 5B | 5B | 5B | 5B | 5B | 5B | 5B |
| DA-8 | — | 4B | 4B | 4B | 4B | 5B | 5B | 5B | 5B |
| DA-9 | — | 4B | 5B | 5B | 5B | 5B | 5B | 5B | 5B |

TABLE 2

| | \multicolumn{9}{c}{DA-1, mol %} |
|---|---|---|---|---|---|---|---|---|---|
| | 100% | 99.8% | 99.5% | 99% | 95% | 90% | 85% | 80% | 75% |
| DA-1 | 0 (Comparative Example) | — | — | — | — | — | — | — | — |
| DA-2 | — | 0.1 | 0.51 | 0.52 | 0.37 | 0.5 | 0.9 | 1.23 | 1.95 |
| DA-3 | — | 0.17 | 0.54 | 0.73 | 1.38 | ND | ND | ND | ND |
| DA-4 | — | 0.18 | 0.79 | 1.37 | 1.69 | ND | ND | ND | ND |
| DA-5 | — | 0.09 | 0.53 | 0.75 | 0.88 | 1.5 | ND | ND | ND |
| DA-6 | — | 0.31 | 0.92 | 1.63 | ND | ND | ND | ND | ND |
| DA-7 | — | 0.87 | 1.34 | 1.97 | ND | ND | ND | ND | ND |
| DA-8 | — | 0.13 | 0.55 | 0.82 | 0.91 | 1.72 | ND | ND | ND |
| DA-9 | — | 0.34 | 0.95 | 1.59 | ND | ND | ND | ND | ND |

The peel strength in table 2 is in Kg/cm. "ND" indicates that the peel strength is too high to test.

TABLE 3

| | \multicolumn{9}{c}{DA-1, mol %} |
|---|---|---|---|---|---|---|---|---|---|
| | 100% | 99.8% | 99.5% | 99% | 95% | 90% | 85% | 80% | 75% |
| DA-1 (bottom) | 10.2 (Comparative Example) | — | — | — | — | — | — | — | — |
| DA-1 (side wall) | 0 (Comparative Example) | — | — | — | — | — | — | — | — |
| DA-1 (untreated region) | 0 (Comparative Example) | — | — | — | — | — | — | — | — |
| DA-2 (bottom) | — | 10.2 | 10.1 | 10.3 | 10.5 | 10.3 | 10.2 | 10.2 | 10.3 |
| DA-2 (side wall) | — | 0.43 | 0.57 | 1.13 | 4.75 | 9.87 | 10.2 | 10.1 | 10.2 |
| DA-2 (untreated region) | — | 0 | 0 | 0 | 0 | 0 | 0 | 0.03 | 0.09 |
| DA-3 (bottom) | — | 10.1 | 10.3 | 10.4 | 11.2 | 11.3 | 11.5 | 11.4 | 11.4 |
| DA-3 (side wall) | — | 0.69 | 3.2 | 7.5 | 10.1 | 10.2 | 10.1 | 10.3 | 10.2 |
| DA-3 (untreated region) | — | 0 | 0 | 0 | 0 | 0 | 0 | 0.05 | 0.15 |
| DA-4 (bottom) | — | 9.9 | 10.1 | 10.3 | 11.1 | 11.2 | 10.9 | 11.2 | 11.3 |
| DA-4 (side wall) | — | 1.25 | 8.15 | 10.1 | 10.3 | 10.2 | 10.5 | 10.4 | 10.3 |
| DA-4 (untreated region) | — | 0 | 0 | 0 | 0 | 0 | 0 | 0.11 | 0.33 |
| DA-5 (bottom) | — | 10.2 | 10.2 | 10.1 | 11.3 | 11.2 | 11.2 | 11.1 | 11.2 |
| DA-5 (side wall) | — | 1.03 | 7.3 | 9.72 | 10.2 | 10.1 | 10.3 | 10.2 | 10.3 |
| DA-5 (untreated region) | — | 0 | 0 | 0 | 0 | 0 | 0 | 0.06 | 0.20 |
| DA-6 (bottom) | — | 10.1 | 10.3 | 10.3 | 10.1 | 10.2 | 10.3 | 10.5 | 10.8 |
| DA-6 (side wall) | — | 0.75 | 3.1 | 5.88 | 9.72 | 10.1 | 10.2 | 10.1 | 10.2 |

TABLE 3-continued

| | DA-1, mol % | | | | | | | | |
|---|---|---|---|---|---|---|---|---|---|
| | 100% | 99.8% | 99.5% | 99% | 95% | 90% | 85% | 80% | 75% |
| DA-6 (untreated region) | | 0 | 0 | 0 | 0 | 0 | 0 | 0.07 | 0.24 |
| DA-7 (bottom) | — | 10.3 | 10.4 | 10.8 | 11.1 | 11.5 | 11.6 | 11.4 | 11.3 |
| DA-7 (side wall) | — | 2.51 | 9.81 | 10.1 | 10.5 | 10.4 | 10.5 | 10.4 | 10.3 |
| DA-7 (untreated region) | — | 0 | 0 | 0 | 0 | 0 | 0 | 1.51 | 2.95 |
| DA-9 (bottom) | — | 10.2 | 10.3 | 10.1 | 11.1 | 11.1 | 11.5 | 11.1 | 11.5 |
| DA-9 (side wall) | — | 1.1 | 5.31 | 7.52 | 9.73 | 10.1 | 10.3 | 10.2 | 10.3 |
| DA-9 (untreated region) | — | 0 | 0 | 0 | 0 | 0 | 0 | 0.03 | 0.09 |

The thickness of the plated copper in Table 3 is in μm.

From the results shown in Table 1, it can be seen that the amic acid ester oligomer of the present disclosure contains, in its structure, a particular divalent organic group in comparison with the comparative example (excluding the particular divalent organic group), by which the adhesion between the polyimide layer and the plated copper layer is greatly improved.

A circuit board on which the circuit fabrication is completed may need to undergo another high-temperature soldering process, and the high temperature may cause degraded adhesion between the polyimide layer and the plated copper layer, which may even affect the circuit performance. As can be seen from the results in Table 2, the amic acid ester oligomer of the present disclosure contains, in its structure, a particular divalent organic group in comparison with the comparative example (excluding the particular divalent organic group), and the adhesion between the resulting polyimide layer and the plated copper layer is relatively stable at high temperatures and a sufficient peel strength can be maintained.

From the results shown in Table 3, it can be seen that the polyimide layer obtained in the present disclosure has superior ability to electroplate copper after activation, compared with the comparative example (which does not contain the particular divalent organic group). For example, for a sample containing 99.5 mol % DA-1, the copper plated on the side walls can be up to 0.57 μm or more, while no copper can be plated onto the side walls in the comparative example. In addition, none of the samples in the example where DA-1 is 99.5 mol %, 99 mol %, 95 mol %, 90 mol %, or 85 mol % are electroplated with copper in the region not irradiated with laser. It is confirmed that the property of the polyimide of the present disclosure varies from the laser-activated region to the non-activated region, and therefore a patterned metal layer or circuit can be successfully prepared. The sample with 80 mol % DA-1 in the example shows a small amount of plated copper; and when DA-1 is 75 mol %, the amount of plated copper is slightly increased. Although the amount is still in an acceptable range, it suggests that when DA-1 is beyond 75 mol %, the difference between the non-activated region and the activated region becomes smaller, and it may not be possible to fabricate a good circuit.

The above-described embodiments of the present disclosure are intended to be illustrative only. Numerous alternative embodiments may be devised by persons skilled in the art without departing from the scope of the following claims.

What is claimed is:

1. A polyimide precursor composition, comprising an amic acid ester oligomer of formula (I):

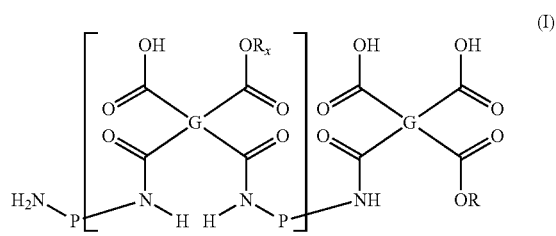

wherein:

r is an integer ranging from 1 to 200;

Each $R_x$ is independently H, $C_1$-$C_{14}$alkyl or a moiety bearing an ethylenic-ally unsaturated group;

Each R is independently $C_1$-$C_{14}$alkyl, $C_6$-$C_{14}$aryl or aralkyl, or a moiety hearing an ethylenically unsaturated group;

Each G is independently a tetravalent organic group; and

Each F is independently a divalent organic group, wherein based on the total moles of the divalent organic groups P present in the composition, about 0.5 mol % to about 25 mol % of the divalent organic group P is a divalent organic group that is capable of forming a coordinate bond with a metal ion, wherein the divalent organic group that is capable of forming a coordinate bond with a metal ion is selected from the group consisting of:

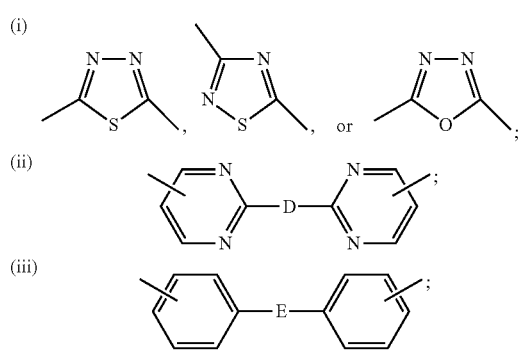

(iv)

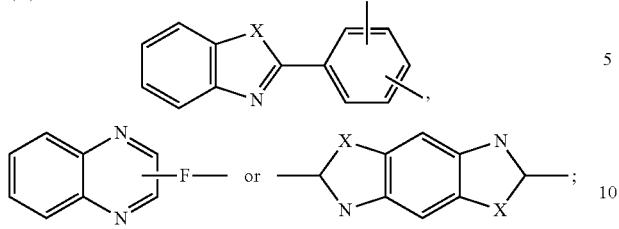

(v)

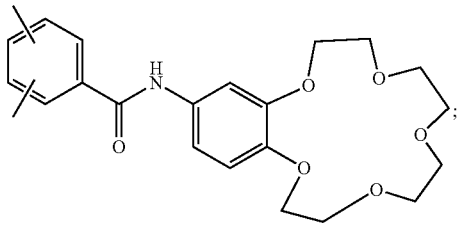

and
(vi) a combination of radicals (i)-(v),
wherein:
D is a bond, —NH—, —S—, —O—, phenylene or

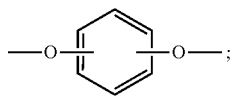

E is 5 or 6-membered nitrogen-containing heterocyclyl

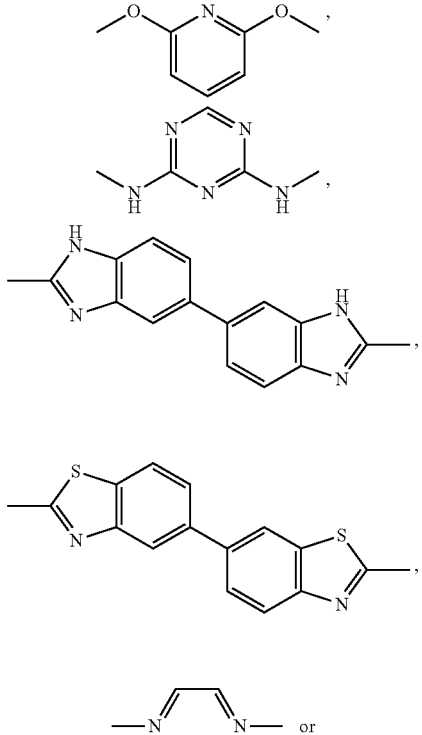

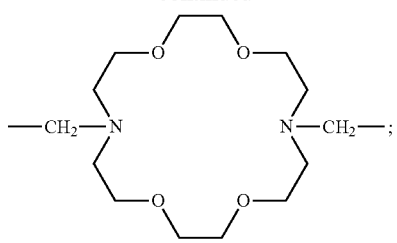

F is phenylene or

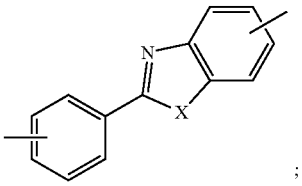

and
X is —NH—, —S— or —O—.

2. The polyimide precursor composition according to claim 1, wherein r is an integer ranging from 5 to 150.

3. The polyimide precursor composition according to claim 1, wherein the divalent organic group that is capable of forming a coordinate bond with a metal ion is selected from:

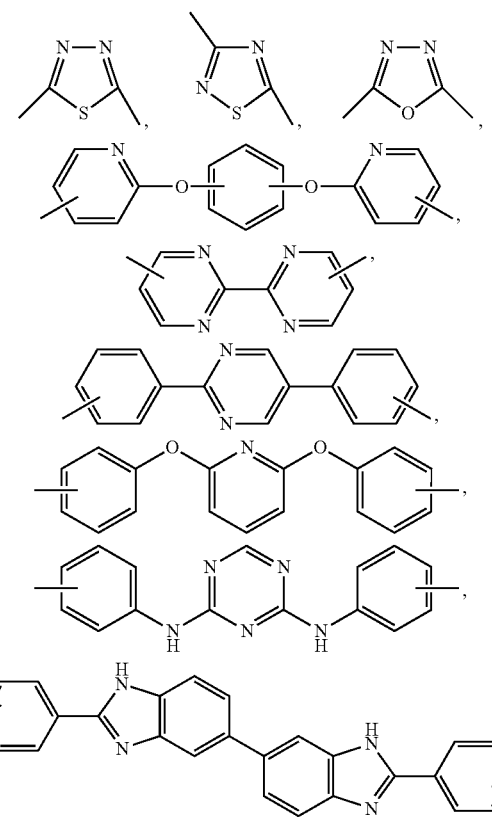

-continued

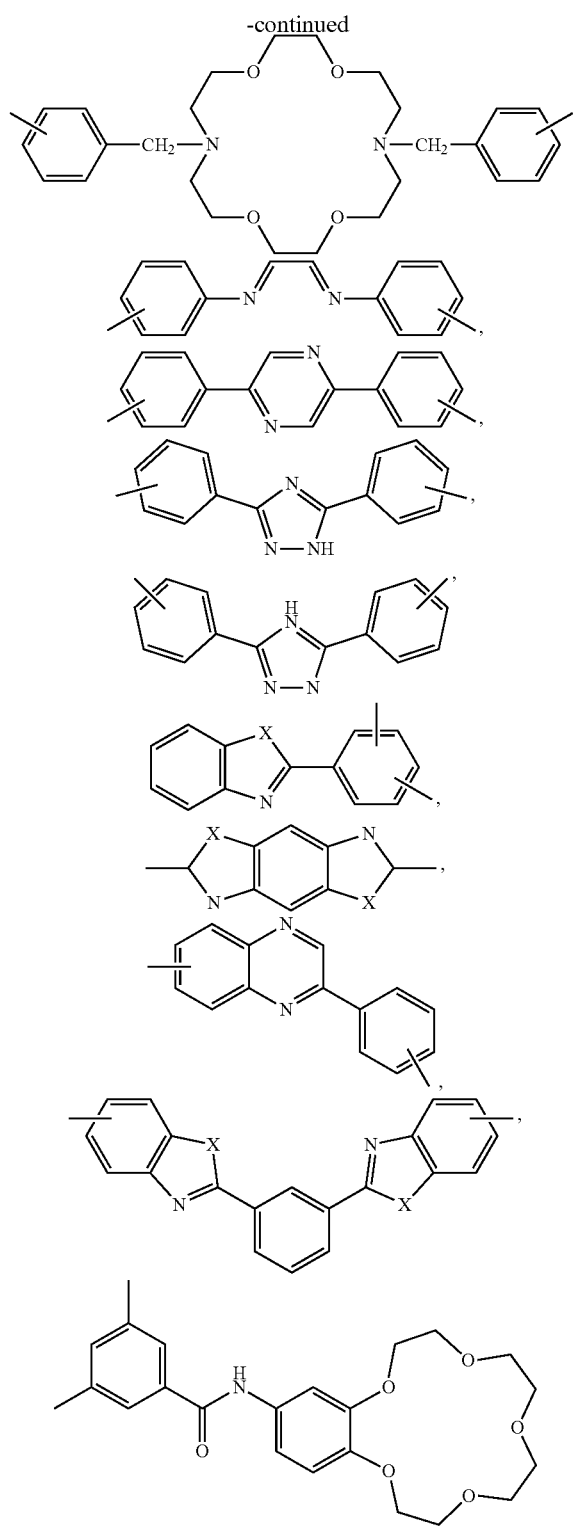

or a combination thereof wherein X is —NH—, —S— or —O—.

4. The polyimide precursor composition according to claim 1, wherein based on the total moles of the divalent organic-groups P present in the composition, about 1 mol % to about 15 mol % of the divalent organic group P is an divalent organic group that is capable of forming a coordinate bond with a metal ion.

5. The polyimide precursor composition according to claim 1, wherein tire remaining divalent organic groups P are each independently a divalent aromatic group or divalent heterocyclic-group other than tire radicals listed in (i) to (v) and are selected horn the group consisting of:

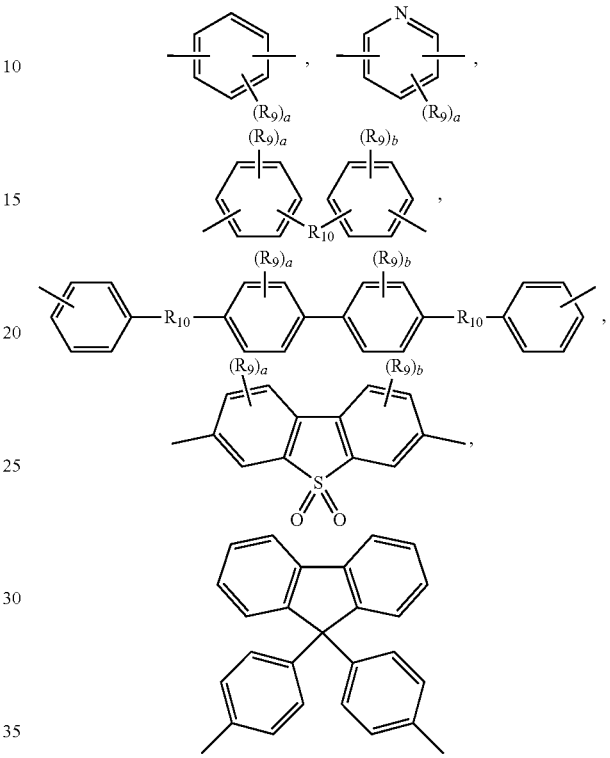

and a combination thereof,
wherein
each $R_9$ is independently H, $C_1$-$C_4$alkyl, $C_1$-$C_4$perfluoroalkyl, $C_1$-$C_4$alkoxyl or halogen;
each a is independently an integer from 0 to 4;
each b is independently an integer from 0 to 4;
$R_{10}$ is a covalent bond, or selected from the group consisting of:
—O—, —S—, —$CH_2$—, —$S(O)_2$—,

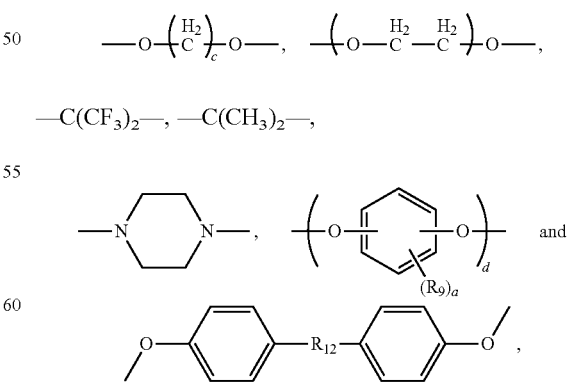

—$C(CF_3)_2$—, —$C(CH_3)_2$—, wherein c and d are each independently an integer from 1 to 20, $R_{12}$ is —$S(O)_2$—, a covalent bond, $C_1$-$C_4$alkylene or $C_1$-$C_4$perfluoroalkylene.

6. The polyimide precursor composition according to claim 1, wherein G is selected from the group consisting of:

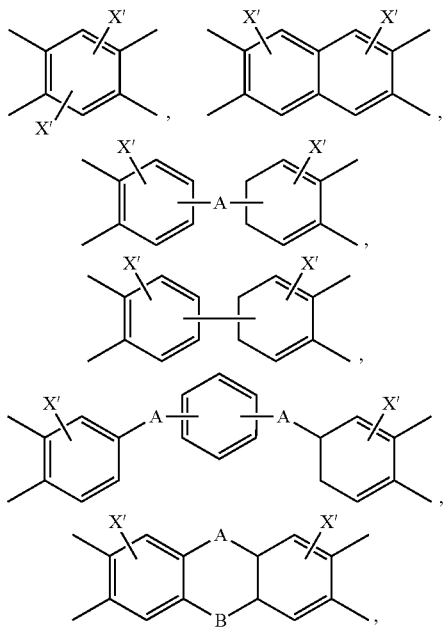

and a combination thereof,
wherein each X' is independently H, halogen, C₁-C₄perfluoroalkyl, C₁-C₄alkyl; and A and B are independently, at each occurrence, a covalent bond, C₁-C₄alkylene unsubstituted or substituted with one or more radicals selected from C₁-C₄alkyl, C₁-C₄perfluoroalkylene, C₁-C₄alkoxylene, silylene, —O—, —S—, —C(O)—, —OC(O)—, —S(O)₂—, —C(═O)O—(C₁-C₄alkylene)-OC(═O)—, phenylene, biphenylene or

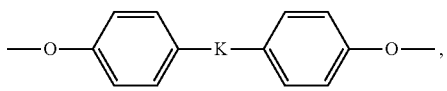

wherein K is —O—, —S(O)₂—, C₁-C₄alkylene or C₁-C₄perfluoroalkylene.

7. The polyimide precursor composition according to claim 1, wherein each R is independently is selected from the group consisting of:

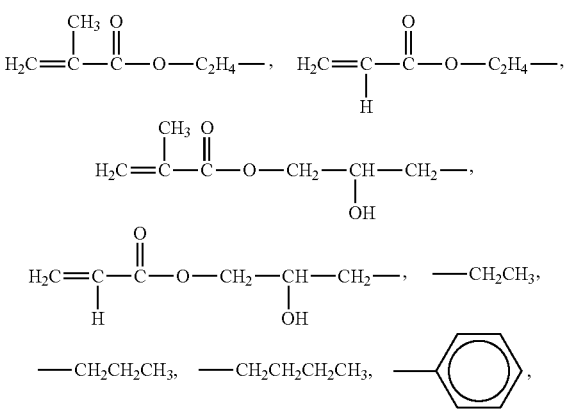

and a combination thereof.

8. The polyimide precursor composition according to claim 1, farther comprising a cyclization promoter having the following formula:

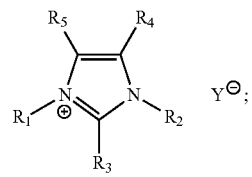

wherein:
R₁ and R₂ are the same or different and are each independently H, C₁-C₆alkyl, C₁-C₆haloalkyl, or C₁-C₆alkyl substituted with one or more C₆-C₁₄aryl,

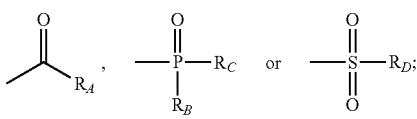

R_A is C₁-C₆alkyl, C₁-C₆haloalkyl, C₁-C₈alkoxy unsubstituted or substituted with one or more C₆-C₁₄aryl, or —NR_ER_F; R_B, R_C, R_D, R_E and R_F are the same or different, and are each independently H, C₁-C₁₄alkyl unsubstituted or substituted with one or more C₆-C₁₄aryl, or C₆-C₁₄ aryl;
R₃, R₄ and R₅ are the same or different, and are each independently H, straight or branched C₁-C₆alkyl unsubstituted or substituted with one or more C₆-C₁₄aryl, straight or branched C₁-C₆hydroxyalkyl, straight or branched C₁-C₆cyanoalkyl, or C₆-C₁₄aryl; and
Y⊖ is an anionic group.

9. The polyimide precursor composition according to claim 1, wherein the amic acid ester oligomer is in an amount of about 10 wt % to about 70 wt %, based on the total weight of the polyimide precursor composition.

10. The polyimide precursor composition according to claim 8, herein the cyclization promoter is in an amount of about 0.1 parts by weight to about 2 parts by weight, based on 100 parts by weight of the amic acid ester oligomer of formula (I).

11. The polyimide precursor composition according to claim 1, wherein the divalent organic group that is capable of forming a coordinate bond with a metal ion is selected horn:

-continued
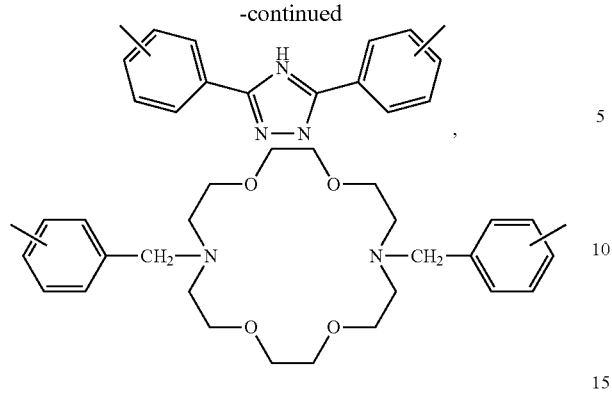
or a combination thereof.
12. A polyimide prepared from the precursor composition according to claim 1.